(12) United States Patent
Chen et al.

(10) Patent No.: US 11,670,947 B2
(45) Date of Patent: *Jun. 6, 2023

(54) BATTERY MANAGEMENT CIRCUIT, DEVICE TO BE CHARGED, AND POWER MANAGEMENT METHOD

(71) Applicant: GUANGDONG OPPO MOBILE TELECOMMUNICATIONS CORP., LTD., Guangdong (CN)

(72) Inventors: Shebiao Chen, Guangdong (CN); Jialiang Zhang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/711,820

(22) Filed: Apr. 1, 2022

(65) Prior Publication Data

US 2022/0224126 A1 Jul. 14, 2022

Related U.S. Application Data

(63) Continuation of application No. 16/206,117, filed on Nov. 30, 2018, now Pat. No. 11,322,949, which is a (Continued)

(30) Foreign Application Priority Data

Oct. 12, 2016 (WO) ................ PCT/CN2016/101944
Feb. 15, 2017 (WO) ................ PCT/CN2017/073653

(51) Int. Cl.
*H02J 7/00* (2006.01)
*H01M 10/44* (2006.01)

(52) U.S. Cl.
CPC ......... *H02J 7/0019* (2013.01); *H01M 10/441* (2013.01); *H02J 7/0014* (2013.01);
(Continued)

(58) Field of Classification Search
CPC ...... H02J 7/0014; H02J 7/0016; H02J 7/0019; H02J 7/0024; H02J 7/0031; H02J 7/0068;
(Continued)

(56) References Cited

U.S. PATENT DOCUMENTS 5,867,798 A 2/1999 Inukai et al.
11,322,949 B2 * 5/2022 Chen ..................... H02J 7/04
(Continued)

FOREIGN PATENT DOCUMENTS

JP 2009033879 A 2/2009

OTHER PUBLICATIONS

Extended European Search Report for EP Application 21159537.6 dated May 19, 2021. (12 pages).
(Continued)

*Primary Examiner* — Edward Tso
*Assistant Examiner* — Aaron Piggush
(74) *Attorney, Agent, or Firm* — Young Basile Hanlon & MacFarlane, P.C.

(57) ABSTRACT

Battery management circuits include a first charging channel, a Cuk circuit, and a communication control circuit. A battery is charged through the first charging channel based on charging voltage and/or charging current provided by a power supply device. The battery includes a first cell and a second cell coupled in series. The communication control circuit is configured to communicate with the power supply device, to make magnitude of the charging voltage and/or charging current provided by the power supply device match a present charging stage of the battery, and the communication control circuit is further configured to send a drive
(Continued)

signal to the Cuk circuit to drive the Cuk circuit to work, to make energy of the first cell and the second cell be transferred through the Cuk circuit to balance voltage of the first cell and voltage of the second cell.

17 Claims, 6 Drawing Sheets

Related U.S. Application Data continuation of application No. PCT/CN2017/087828, filed on Jun. 9, 2017.

(52) U.S. Cl.
CPC .......... *H02J 7/0016* (2013.01); *H02J 7/0024* (2013.01); *H02J 7/00036* (2020.01); *H02J 7/0068* (2013.01); *H02J 7/00302* (2020.01); *H02J 7/00712* (2020.01); *H02J 7/007182* (2020.01); *H02J 7/0031* (2013.01); *H02J 7/00034* (2020.01); *H02J 7/00714* (2020.01); *H02J 2207/40* (2020.01)

(58) Field of Classification Search
CPC ............. H02J 7/007182; H02J 7/00712; H02J 7/00714; H02J 7/00302; H02J 7/00034; H02J 7/00036; H02J 2207/40; H01M 10/441

USPC ....... 320/107, 132, 134, 136, 140, 141, 145, 320/156, 161

See application file for complete search history.

(56) References Cited

U.S. PATENT DOCUMENTS

| | | | |
|---|---|---|---|
| 2010/0231167 A1 | 9/2010 | Ohnuki | |
| 2012/0043923 A1* | 2/2012 | Ikriannikov | .......... H02J 7/0014 307/82 |
| 2012/0112705 A1* | 5/2012 | Wang | ........................ H02J 7/00 320/152 |
| 2014/0042815 A1* | 2/2014 | Maksimovic | ........... H02J 1/102 307/63 |
| 2016/0064962 A1* | 3/2016 | Huang | .................. H02J 7/0071 324/427 |

OTHER PUBLICATIONS

Korean Office Action with English Translation for KR Application 1020217014756 dated Feb. 17, 2022. (7 pages).
Chinese First Office Action with English Translation for CN Application 202110394294.0 dated Apr. 29, 2022. (18 pages).

\* cited by examiner

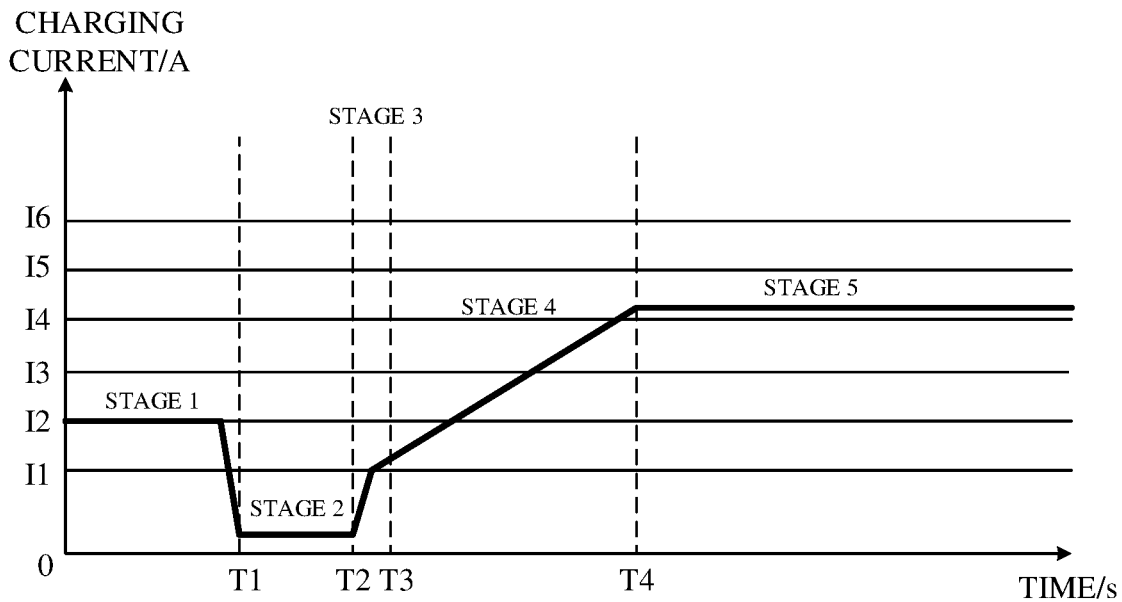

FIG. 10

| COMMUNICATE WITH THE POWER SUPPLY DEVICE, TO MAKE MAGNITUDE OF THE CHARGING VOLTAGE AND/OR CHARGING CURRENT MATCH A PRESENT CHARGING STAGE OF THE BATTERY, WHEN THE POWER SUPPLY DEVICE CHARGES THE BATTERY THROUGH THE FIRST CHARGING CHANNEL | 1110 |

| SEND A DRIVE SIGNAL TO THE Cuk CIRCUIT TO DRIVE THE Cuk CIRCUIT TO WORK, TO MAKE ENERGY OF THE FIRST CELL AND THE SECOND CELL BE TRANSFERRED THROUGH Cuk CIRCUIT TO BALANCE VOLTAGE OF THE FIRST CELL AND VOLTAGE OF THE SECOND CELL, WHEN THE VOLTAGE OF THE FIRST CELL AND THE VOLTAGE OF THE SECOND CELL ARE UNBALANCED | 1120 |

FIG. 11

BATTERY MANAGEMENT CIRCUIT, DEVICE TO BE CHARGED, AND POWER MANAGEMENT METHOD

CROSS-REFERENCE TO RELATED APPLICATION(S)

This application is a continuation of U.S. application Ser. No. 16/206,117, which is a continuation of International Application No. PCT/CN2017/087828, filed on Jun. 9, 2017, which claims priority to International Application No. PCT/CN2016/101944, filed in China on Oct. 12, 2016, and International Application No. PCT/CN2017/073653, filed in China on Feb. 15, 2017, the disclosures of all of which are hereby incorporated by reference in their entireties.

TECHNICAL FIELD

This disclosure relates to the field of charging technology, and particularly to a battery management circuit, a device to be charged, and a power management method.

BACKGROUND

At present, devices to be charged, such as smart phones, are enjoying increasing popularity among consumers. However, the device to be charged needs to be charged frequently due to their high power consumption.

In order to improve charging speed, a practical scheme is to charge the device to be charged with great current. The greater the current, the higher the charging speed is. Nevertheless, the heating problem of the device to be charged is also getting more serious.

Therefore, requirements on reducing heating of the device to be charged are proposed.

SUMMARY

According to a first aspect of the disclosure, a battery management circuit is provided. The battery management circuit includes a first charging channel, a Cuk circuit, and a communication control circuit. Charging voltage and/or charging current is received from a power supply device through the first charging channel and provided to a battery directly through the first charging channel, where the battery includes a first cell and a second cell coupled in series. When the power supply device charges the battery through the first charging channel, the communication control circuit is configured to communicate with the power supply device to make magnitude of the charging voltage and/or charging current from the power supply device match a present charging stage of the battery. When voltage of the first cell and voltage of second cell are unbalanced, the communication control circuit is further configured to send a drive signal to the Cuk circuit to drive the Cuk circuit to work, to make energy of the first cell and the second cell be transferred through the Cuk circuit to balance the voltage of the first cell and the voltage of the second cell.

According to a second aspect of the disclosure, a device to be charged is provided. The device to be charged includes a battery including a first cell and a second cell coupled in series and the battery management circuit according to the first aspect of the disclosure.

According to a third aspect of the disclosure, a battery management method is provided. The battery management method includes the following. Communicate with a power supply device to make magnitude of charging voltage and/or charging current provided by the power supply device match a present charging stage of a battery, when the power supply device charges the battery through a first charging channel directly, the battery includes a first cell and a second cell coupled in series. Send a drive signal to a Cuk circuit to drive the Cuk circuit to work, to make energy of the first cell and the second cell be transferred through the Cuk circuit to balance voltage of the first cell and voltage of the second cell, when the voltage of the first cell and the voltage of second cell are unbalanced.

BRIEF DESCRIPTION OF DRAWINGS

FIG. 10 is a flowchart illustrating a quick charging process according to an implementation of the present disclosure.

FIG. 11 is a schematic flowchart illustrating a battery management method according to an implementation of the present disclosure.

DETAILED DESCRIPTION

Figure 1:
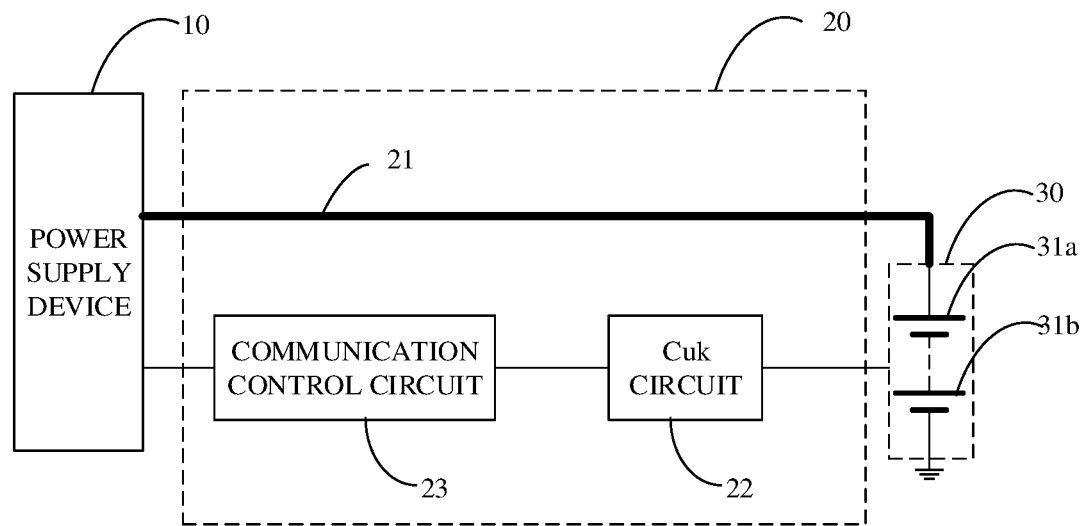
FIG. 1 is a schematic structural diagram illustrating a charging system according to an implementation of the present disclosure.

A power supply device configured to charge a device to be charged has been proposed in the related art. The power supply device works in a constant-voltage mode, where voltage output by the power supply device remains nearly constant, such as 5V, 9V, 12V, 20V, etc.

Voltage output by the power supply device is however not suitable for being applied directly to a battery. Instead, the voltage output by the power supply device needs to be converted by a conversion circuit of the device to be charged, so that expected charging voltage and/or charging current of the battery of the device to be charged can be obtained.

The conversion circuit is configured to convert voltage output by the power supply device, so as to meet requirements on expected charging voltage and/or charging current of the battery.

As an implementation, the conversion circuit can be a charging management module, such as a charging integrated circuit (IC), which, when the battery is charged, is configured to manage the charging voltage and/or charging current of the battery. The conversion circuit functions as a voltage feedback module and/or a current feedback module, so as to achieve management of the charging voltage and/or charging current of the battery.

For example, a charging process of the battery can include at least one of a trickle charging stage, a constant-current charging stage, and a constant-voltage charging stage. In the trickle charging stage, the conversion circuit can utilize a current feedback loop to make current flowing into the battery in the trickle charging stage satisfy expected charging current of the battery (such as a first charging current). In the constant-current charging stage, the conversion circuit can utilize a current feedback loop to make current flowing into the battery in the constant-current charging stage satisfy expected charging current of the battery (such as a second charging current, which may be greater than the first charging current). In the constant-voltage charging stage, the conversion circuit can utilize a voltage feedback loop to make voltage applied to the battery in the constant-voltage charging stage satisfy expected charging voltage of the battery.

As one implementation, when the voltage output by the power supply device is higher than the expected charging voltage of the battery, the conversion circuit can decrease the voltage output by the power supply device to make decreased charging voltage meet requirements on the expected charging voltage of the battery. As another implementation, when the voltage output by the power supply device is lower than the expected charging voltage of the battery, the conversion circuit can increase the voltage output by the power supply device to make increased charging voltage meet requirements on charging voltage of the battery.

As yet another implementation, the voltage output by the power supply device is a constant 5V voltage, for example. When the battery includes a single cell (for example, a lithium battery cell, with a 4.2V charging cut-off voltage), the conversion circuit (such as a Buck circuit) can decrease (that is, step down) the voltage output by the power supply device to make the decreased charging voltage meet requirements on charging voltage of the battery.

As still another implementation, the voltage output by the power supply device is a constant 5V voltage, for example. When the power supply device charges a battery with two or more single-cells coupled in series (for example, a lithium battery cell, with a 4.2V charging cut-off voltage), the conversion circuit (such as a Boost circuit) can increase (that is, step up) the voltage output by the power supply device to make the increased charging voltage meet requirements on charging voltage of the battery.

The conversion circuit is limited by low circuit conversion efficiency, which results in electrical energy that fails to be converted dissipating in the form of heat. The heat can be accumulated inside the device to be charged. Since designed space and heat dissipation space of the device to be charged are both very small, for example, the physical size of a user's mobile terminal is increasingly lighter and thinner, and a large number of electronic components are densely arranged in the mobile terminal at the same time, difficulty in designing the conversion circuit is increased. In addition, it is difficult to remove promptly heat accumulated inside the device to be charged, which in turn results in abnormality of the device to be charged.

For example, heat accumulated inside the conversion circuit may cause heat interference with electronic components near the conversion circuit, which results in working abnormality of the electronic components. For another example, the heat accumulated inside the conversion circuit may shorten service life of the conversion circuit and the electronic components near the conversion circuit. For yet another example, the heat accumulated inside the conversion circuit may cause heat interference with the battery, which in turn brings about abnormality of charge and discharge of the battery. For still another example, the heat accumulated inside the conversion circuit may raise temperature of the device to be charged and thus influence user experience in the charging process. For still another example, the heat accumulated inside the conversion circuit may result in short circuit of the conversion circuit itself, causing abnormality of charging since the voltage output by the power supply device is applied directly to the battery. In case that the battery is charged with overvoltage for a long time, battery explosion may even occur, thus putting users at risk.

According to an implementation of the present disclosure, a power supply device with adjustable output-voltage is provided. The power supply device can acquire state information of a battery. The state information of a battery can include present power and/or present voltage of the battery. The power supply device can adjust output-voltage of the power supply device itself according to the state information of the battery acquired to meet requirements on charging voltage and/or charging current of the battery. Output-voltage adjusted by the power supply device can be applied directly to the battery to charge the battery (referred to as "direct charging" hereinafter). In addition, in the constant-current charging stage of the battery, the output-voltage adjusted by the power supply device can be applied directly to the battery for charging.

The power supply device can function as a voltage feedback module and/or a current feedback module to achieve management of the charging voltage and/or charging current of the battery.

The power supply device can adjust the output-voltage of the power supply device itself according to the state information of the battery acquired as follows. The power supply device can acquire the state information of the battery in real time and adjust the output-voltage of the power supply device itself according to real-time state information of the battery acquired each time to meet requirements on the charging voltage and/or charging current of the battery.

The power supply device can adjust the output-voltage of the power supply device itself according to the real-time state information of the battery acquired as follows. With increase in voltage of the battery in the charging process, the power supply device can acquire present state information of the battery at different time points in the charging process and adjust in real time the output-voltage of the power supply device itself according to the present state information of the battery, so as to meet requirements on the charging voltage and/or charging current of the battery.

For example, the charging process of the battery can include at least one of the trickle charging stage, the constant-current charging stage, and the constant-voltage charging stage. In the trickle charging stage, the power supply device can output the first charging current in the tricked charging stage to charge the battery, so as to meet requirements on charging current (the first charging current can be a constant DC current) of the battery. In the constant-current charging stage, the power supply device can utilize the current feedback loop to make the current output in the constant-current charging stage from the power supply device to the battery meet requirements of the battery on charging current, such as the second charging current. The second charging current may be a pulsating waveform current and may be greater than the first charging current, where a peak value (that is, peak current) of the pulsating waveform current in the constant-current charging stage may be greater than magnitude of the constant DC current in the trickle charging stage, and "constant-current" in the constant-current charging stage may refer to a situation where the peak value or average value of the pulsating waveform current remain nearly constant. In the constant-voltage charging stage, the power supply device can utilize the voltage feedback loop to make the voltage output in the constant-voltage charging stage from the power supply device to the device to be charged (that is, constant DC voltage) remain constant.

For example, in implementations of the present disclosure, the power supply device can be mainly configured to control the constant-current charging stage of the battery of the device to be charged. In other implementations, control of the trickle charging stage and the constant-voltage charging stage of the battery of the device to be charged can also be cooperatively completed by the power supply device of the implementation of the present disclosure and an extra charging chip of the device to be charged. Compared with charging power of the battery received in the constant-current charging stage, charging powers of the battery received in the trickle charging stage and in the constant-voltage charging stage are lower, so conversion efficiency loss and heat accumulation of the charging chip of the device to be charged are acceptable. It should be noted that, in implementations of the present disclosure, the constant-current charging stage or the constant-current stage can refer to a charging mode of controlling output-current of the power supply device but does not require that the output-current of the power supply device remain completely constant, and may be, for example, a peak value or an average value of a pulsating waveform current output by the power supply device remaining nearly constant, or remaining nearly constant within a certain time period. Practically, for example, in the constant-current charging stage, the power supply device usually charges the battery in a multi-stage constant current charging manner.

Multi-stage constant current charging can include N constant-current stages, where N is an integer not less than two (N>=2). In the multi-stage constant current charging, a first stage of charging begins with a pre-determined charging current. The N constant-current stages of the multi-stage constant current charging are executed in sequence from the first stage to the $N^{th}$ stage. When a previous constant-current stage ends and a next constant-current stage begins, the peak value or average value of the pulsating waveform current may decrease. When voltage of the battery reaches a threshold value of charging cut-off voltage, the multi-stage constant current charging proceeds to a subsequent constant-current stage, that is, the previous constant-current stage ends and the next constant-current stage begins. Current conversion between two adjacent constant-current stages may be gradual or in a step-like manner.

In addition, in case that the current output by the power supply device is a pulsating DC current, the constant-current mode can refer to a charging mode of controlling a peak value or an average value of the pulsating DC current, that is, controlling the peak value of the current output by the power supply device not to be greater than current corresponding to the constant-current mode. Furthermore, in case that the current output by the power supply device is an alternating current (AC) current, the constant-current mode can refer to a charging mode of controlling a peak value of the AC current.

In addition, it should be noted that, in the implementations of the present disclosure, the device to be charged can be a terminal. The "terminal" can include but is not limited to a device configured through a wired line and/or a wireless interface to receive/transmit communication signals. Examples of the wired line may include, but are not limited to, at least one of a public switched telephone network (PSTN), a digital subscriber line (DSL), a digital cable, a direct connection cable, and/or other data connection lines or network connection lines. Examples of the wireless interface may include, but are not limited to, a wireless interface with a cellular network, a wireless local area network (WLAN), a digital television network (such as a digital video broadcasting-handheld (DVB-H) network), a satellite network, an AM-FM broadcast transmitter, and/or with other communication terminals. A communication terminal configured to communicate through a wireless interface may be called a "wireless communication terminal", a "wireless terminal", and/or a "mobile terminal". Examples of a mobile terminal may include, but are not limited to, a satellite or cellular telephone, a personal communication system (PCS) terminal capable of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and/or other electronic devices equipped with radio telephone capability such as a conventional laptop or a handheld receiver. In addition, in the implementation of the present disclosure, the device to be charged or terminal can also include a power bank. The power bank can be charged by the power supply device and thus store energy to charge other electronic devices.

Furthermore, in an implementation of the present disclosure, when a pulsating waveform voltage output by the power supply device is applied directly to a battery of the device to be charged to charge the battery, charging current can be represented in the form of a pulsating wave (such as a steamed bun wave). It can be understood that, the charging current can charge the battery in an intermittent manner. Period of the charging current can vary with frequency of an input AC such as an AC power grid. For instance, frequency corresponding to the period of the charging current is N times (N is a positive integer) or N times the reciprocal of frequency of a power grid. Additionally, when the charging current charges the battery in an intermittent manner, current waveform corresponding to the charging current can include one pulse or one group of pulses synchronized with the power grid.

As an implementation, in an implementation of the present disclosure, when the battery is charged (such as in at least one of the trickle charging stage, the constant-current charging stage, and the constant-voltage charging stage), the battery can receive a pulsating DC (direction remains constant, and magnitude varies with time), an AC (both direction and magnitude vary with time), or a DC (that is, a constant DC, neither magnitude nor direction varies with time) output by the power supply device.

As to a conventional device to be charged, the device to be charged usually has only one single cell. When the single cell is charged with great charging current, heating of the device to be charged is serious. In order to guarantee charging speed and reduce heating of the device to be charged, structure of the cell of the device to be charged is modified in the implementations of the present disclosure. A battery with cells coupled in series, together with a battery management circuit that is able to conduct direct charging on the battery with cells coupled in series, is provided. Since, to achieve equal charging speed, charging current of the battery with cells coupled in series is 1/N time the magnitude of charging current of the battery with one single cell, where N represents the number of cells coupled in series of the device to be charged. For the equal charging speed, the battery management circuit of the implementations of the present disclosure acquires smaller charging current from an external power supply device, thereby reducing heating in the charging process.

FIG. 1 is a schematic structural diagram illustrating a charging system according to an implementation of the present disclosure. The charging system includes a power supply device 10, a battery management circuit 20, and a battery 30. The battery management circuit 20 can be configured to manage the battery 30. As an implementation, the battery management circuit 20 can be configured to manage a charging process of the battery 30, such as selecting a charging channel, controlling charging voltage and/or charging current, and so on. As another implementation, the battery management circuit 20 can be configured to manage cells of the battery 30, such as balancing voltage between the cells of the battery 30.

The battery management circuit 20 can include a first charging channel 21 and a communication control circuit 23.

Through the first charging channel 21, charging voltage and/or charging current can be received from the power supply device 10 and applied to the battery 30 (that is, across the battery 30) for charging.

In other words, through the first charging channel 21, direct charging can be conducted on the battery 30 by applying directly the charging voltage and/or charging current received from the power supply device 10 to the battery 30. "Direct charging" is elaborated in the whole disclosure and will not be repeated herein. The first charging channel 21 can be referred to as a direct charging channel. The direst charging channel does not need to be provided with a conversion circuit such as a charging IC. That is to say, unlike a conventional charging channel, through the direct charging channel, the charging voltage and/or charging current received from the power supply device do not need to be converted and then applied to the battery. Instead, through the direct charging channel, the charging voltage and/or charging current received from the power supply device can be directly applied to the battery.

The first charging channel 21 can be, for example, a wire. Alternatively, the first charging channel 21 can be provided with other circuit components unrelated to charging voltage and/or charging current conversion. For instance, the battery management circuit 20 includes the first charging channel 21 and a second charging channel. The first charging channel 21 can be provided with a switch component configured to switch between charging channels, which will be described in detail in FIG. 7.

The power supply device 10 can be the power supply device with adjustable output-voltage mentioned above. However, the types of the power supply device 10 are not limited herein. For example, the power supply device 10 can be a device specially configured to charge such as an adaptor, a power bank, etc., or other devices that are able to provide both power and data service such as a computer.

The battery 30 according to the implementation of the present disclosure can include multiple cells coupled in series (at least two cells). The cells coupled in series can be configured to divide the charging voltage provided by the power supply device 10 in the charging process. As illustrated in FIG. 1, a first cell 31a and a second cell 31b can be any two of the multiple cells or any two groups of the multiple cells. Exemplarily, when the first cell 31a (or the second cell 31b) includes a group of cells, all cells in this cell-group can be coupled in series or in parallel. The coupling manners of the cells are not limited herein.

The battery 30 can include one battery or multiple batteries. That is to say, the cells coupled in series according to the implementation of the present disclosure can be packaged into one battery pack to form one battery or be packaged into multiple battery packs to form multiple batteries. For instance, the battery 30 can be one battery. The one battery includes the first cell 31a and the second cell 31b coupled in series. For another instance, the battery 30 can include two batteries. One of the two batteries includes the first cell 31a, and the other one of the two batteries includes the second cell 31b.

When the power supply device 10 charges the battery 30 through the first charging channel 21, the communication control circuit 23 can be configured to communicate with the power supply device 10 to make magnitude of the charging voltage and/or charging current received from the power supply device 10 match a present charging stage of the battery 30, or make magnitude of the charging voltage and/or charging current received from the power supply device 10 meet requirements on the charging voltage and/or charging current in the present charging stage of the battery 30.

As mentioned above, the first charging channel 21 is a direct charging channel and the charging voltage and/or charging current received from the power supply device 10 can be applied directly to the battery 30 through the first charging channel 21. In order to achieve direct charging, the implementations of the present disclosure introduce in the battery management circuit 20 a control circuit with a communication function, that is, the communication control circuit 23. The communication control circuit 23 can be configured to keep communicating with the power supply device 10 in a direct charging process to form a closed-loop feedback mechanism, so as to enable the power supply device 10 to acquire the state information of the battery in real time, thus adjusting continuously the charging voltage and/or charging current flowing into the first charging channel to guarantee that magnitude of the charging voltage and/or charging current received from the power supply device 10 matches the present charging stage of the battery 30.

The present charging stage of the battery 30 can be any one of the trickle charging stage, the constant-current charging stage, and the constant-voltage charging stage.

In the trickle charging stage of the battery 30, the communication control circuit 23 can be configured to communicate with the power supply device 10, so that the power supply device 10 can adjust charging current provided to the first charging channel 21, to make the charging current match charging current corresponding to the trickle charging stage, or make the charging current to meet requirements on charging current in the trickle charging stage of the battery 30.

In the constant-voltage charging stage of the battery 30, the communication control circuit 23 can be configured to communicate with the power supply device 10, so that the power supply device 10 can adjust charging voltage provided to the first charging channel 21, to make the charging voltage match charging voltage corresponding to the constant-voltage charging stage, or make the charging voltage meet requirements on charging voltage in the constant-voltage charging stage of the battery 30.

In the constant-current charging stage of the battery 30, the communication control circuit 23 can be configured to communicate with the power supply device 10, so that the power supply device 10 can adjust charging current provided to the first charging channel 21, to make the charging current match charging current corresponding to the constant-current charging stage, or make the charging current meet requirements on charging current in the constant-current charging stage of the battery 30.

In implementations of the present disclosure, content communicated and communication methods between the communication control circuit 23 and the power supply device 10 are not limited. The above aspects will be described in detail hereinafter in conjunction with specific implementations and will not be repeated herein.

The battery management circuit 20 can further include a Cuk circuit 22. In case that voltage of the first cell 31a and voltage of the second cell 31b are unbalanced, the communication control circuit 23 is configured to send a drive signal to the Cuk circuit 22 to drive the Cuk circuit 22 to work, to make energy of the first cell 31a and the second cell 31b be transferred through the Cuk circuit 22 to balance the voltage of the first cell and the voltage of the second cell. The cuk circuit 22 can be comprehended as a type of DC/DC converter that has an output voltage magnitude that is either greater than or less than the input voltage magnitude.

The battery management circuit according to the implementation of the present disclosure can be configured to conduct direct charging on the battery. In other words, the battery management circuit according to the implementation of the present disclosure is a battery management circuit that supports a direct charging architecture. In the direct charging architecture, the direct charging channel does not need to be provided with a conversion circuit, which in turn reduces heating of the device to be charged in the charging process.

Direct charging scheme can reduce heating of the device to be charged in the charging process to some extent. However, when charging current received from the power supply device 10 is excessive, such as an output-current of the power supply device 10 reaching a magnitude between 5 A and 10 A, heating of the battery management circuit 20 is still serious, and thus safety problems may occur.

In order to guarantee charging speed and further reduce heating of the device to be charged in the charging process, structure of the battery is modified in the implementation of the present disclosure. A battery with cells coupled in series is provided. Compared with a battery with one single cell, to achieve an equal charging speed, charging current of the battery with cells coupled in series is 1/N time the magnitude of charging current of a battery with one single cell, where N represents the number of cells coupled in series of the device to be charged. That is to say, as to an equal charging speed, the implementation of the present disclosure can substantially reduce magnitude of charging current, thereby further reducing heating of the device to be charged in the charging process.

For example, as to a single-cell battery of 3000 mAh, a 9 A (Ampere) charging current is needed to reach a 3 C (Coulomb) charging speed. In order to reach an equal charging speed and reduce heating of the device to be charged in the charging process at the same time, two cells, each of 1500 mAh, can be coupled in series to replace the single cell of 3000 mAh. As a result, only a 4.5 A charging current is needed to reach the 3 C charging speed. In addition, compared with the 9 A charging current, the 4.5 A charging current produces substantially less heat than the 9 A charging current.

In addition, the power management circuit in the implementation of the present disclosure can be configured to balance voltage between cells coupled in series and make parameters of the cells coupled in series be approximate to facilitate unified management of cells of the battery. Furthermore, in case that the battery includes multiple cells, keeping parameters between the cells consistent can improve overall performance and service life of the battery.

It should be noted that, since a direct charging manner is adopted to charge the battery 30 with multiple cells coupled in series though the first charging channel 21, charging voltage received from the power supply device 10 needs to be higher than total voltage of the battery 30. In general, working voltage of a single cell is between 3.0V and 4.35V. In case of double cells coupled in series, when the first charging channel 21 (that is, the direct charging channel) is adopted in the charging process, output-voltage of the power supply device 10 can be set equal to or higher than 10V.

A Cuk circuit can sometimes be referred to as a Cuk chopping circuit. The Cuk circuit is frequently configured to conduct DC/DC conversion. Therefore, the Cuk circuit can sometimes be referred to as a Cuk converter.

Figure 2:
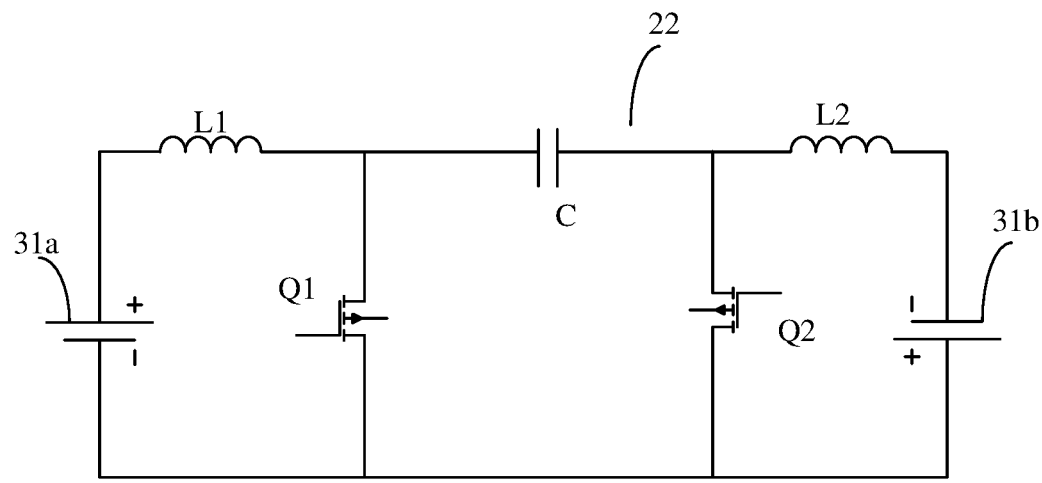
FIG. 2 is a schematic diagram illustrating the coupling relationship between a first cell, a second cell, and a Cuk circuit according to an implementation of the present disclosure.

Referring to FIG. 2, an exemplary Cuk circuit includes at least one switch transistor, a first inductor and a second inductor, and a capacitor coupled between the first inductor and the second inductor, the first inductor is further coupled with a positive electrode of the first cell and the second inductor is further coupled with a negative electrode of the second cell, and the at least one switch transistor has one end coupled between the capacitor and one inductor and another end coupled with an electrode of the first cell or the second cell.

As one example, the at least one switch transistor includes a first switch transistor and a second switch transistor, the first switch transistor has one end coupled between the capacitor and the first inductor, another end coupled with a negative electrode of the first cell, and still another end coupled with the communication circuit; the second switch transistor has one end coupled between the capacitor and the second inductor, another end coupled with a positive electrode of the second cell, and still another end coupled with the communication circuit. The communication control circuit is configured to send the drive signal to the first switch transistor and the second switch transistor respectively in a predetermined time sequence to control direction and speed of energy transfer between the first cell and the second cell.

Details of the Cuk circuit and energy transfer between the first cell and the second cell will be given below.

In implementations of the present disclosure, directions of energy transfer between the first cell 31a and the second cell 31b during working of the Cuk circuit 22 are not limited. Energy can be transferred unidirectionally or bi-directionally. The following will illustrate a bi-directional energy transfer process between the first cell 31a and the second cell 31b with reference to FIG. 2.

As illustrated in FIG. 2, one side of the Cuk circuit 22 is coupled with the first cell 31a, and the other side of the Cuk circuit 22 is coupled with the second cell 31b. The first cell 31a and the second cell 31b are isolated with each other through a capacitor C, and energy can be transferred between the first cell 31a and the second cell 31b through the capacitor C. Capacitance value of the capacitor C is not limited herein. For example, the capacitance value the capacitor C can be set great enough for the capacitor C to be consistently in a steady state during working of the Cuk circuit 22, where voltage across the capacitor C remains nearly constant. An inductor L1 is set near the first cell 31*a*, and an inductor L2 is set near the second cell 31*b*. Thanks to the inductor L1 and the inductor L2, the pulsation of current in the Cuk circuit can be substantially reduced. In actual circuit arrangements, distance between the inductor L1 and the inductor L2 can be set very short, such that the inductor L1 and the inductor L2 can produce mutual inductance, thereby further reducing pulsation of current in the Cuk circuit 22. In addition, the Cuk circuit 22 can include a switch transistor Q1 and a switch transistor Q2, and the switch transistor Q1 and the switch transistor Q2 each can be a MOS (metal oxide semiconductor) transistor. When the voltage of the first cell 31*a* and the voltage of the second cell 31*b* are balanced, the switch transistor Q1 and the switch transistor Q2 are both off. In this case, the Cuk circuit 22 does not work. When the voltage of the first cell 31*a* and the voltage of the second cell 31*b* are unbalanced, the communication control circuit 23 can be configured to send a drive signal to the switch transistor Q1 and the switch transistor Q2 respectively in a certain time sequence, to control the on-off state of the switch transistor Q1 and the switch transistor Q2, so as to control direction and speed of energy transfer between the first cell 31*a* and the second cell 31*b*.

In case that the voltage of the first cell 31*a* is higher than the voltage of the second cell 31*b*, the communication control circuit 23 needs to transfer energy of the first cell 31*a* to the second cell 31*b*. The communication control circuit 23 can execute the following control logic alternately: the switch transistor Q1 is on and the switch transistor Q2 is off; the switch transistor Q1 is off and the switch transistor Q2 is on.

Figure 3:
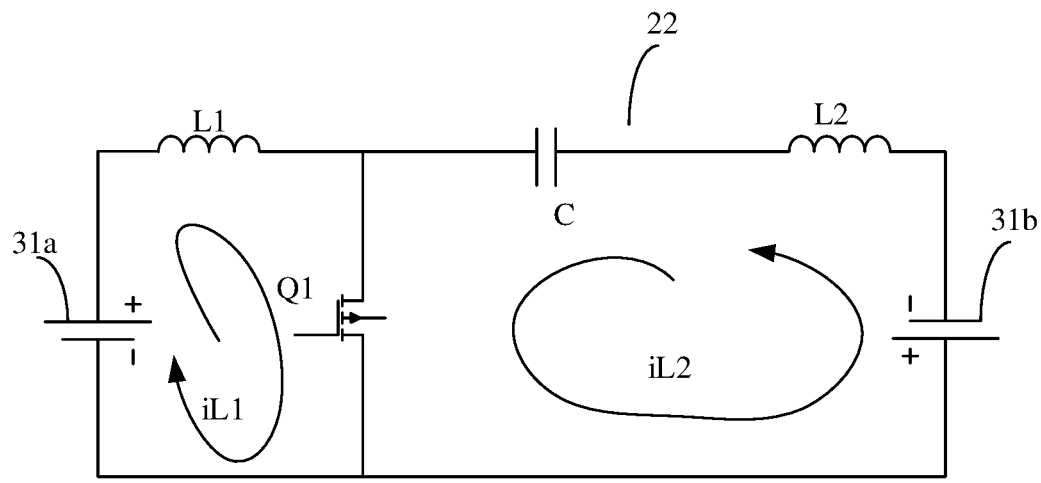
FIG. 3 is an exemplary diagram illustrating a working state of a Cuk circuit according to an implementation of the present disclosure.

When the switch transistor Q1 is on and the switch transistor Q2 is off, as illustrated in FIG. 3, the first cell 31*a* and the inductor L1 form a closed circuit (referred to as a closed circuit 1 hereinafter); the capacitor C, the inductor L2, and the second cell 31*b* form another closed circuit (referred to as a closed circuit 2 hereinafter). In the closed circuit 1, the first cell 31*a* provides energy for the inductor L1 through current iL1 to make the inductor L1 store energy. In the closed circuit 2, the capacitor C discharges, so as to provide energy for the second cell 31*b* and store energy for the inductor L2.

Figure 4:
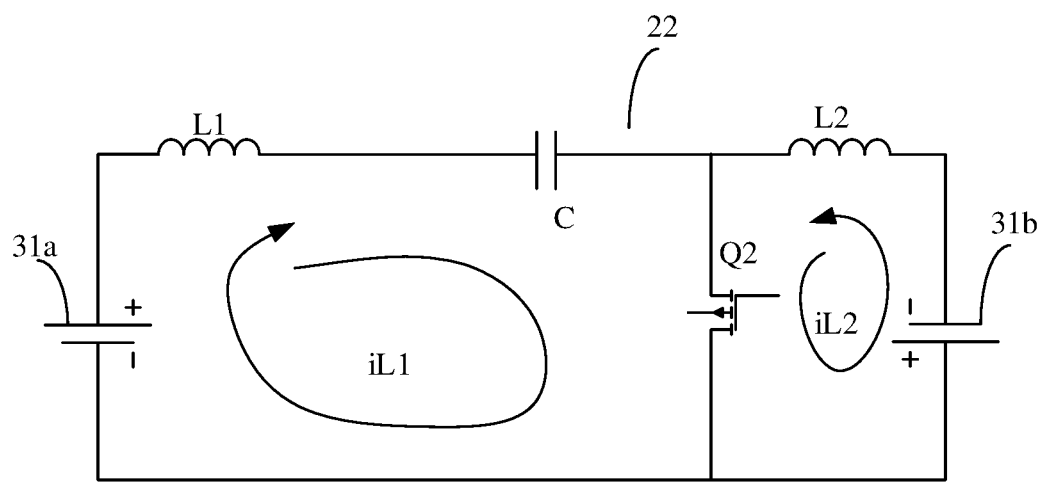
FIG. 4 is an exemplary diagram illustrating another working state of a Cuk circuit according to an implementation of the present disclosure.

When the switch transistor Q1 is off and the switch transistor Q2 is on, as illustrated in FIG. 4, the first cell 31*a*, the inductor L1, and the capacitor C form a closed circuit (referred to as a closed circuit 3 hereinafter); the inductor L2 and the second cell 31*b* form another closed circuit (referred to as a closed circuit 4 hereinafter). In the closed circuit 3, the first cell 31*a* and the inductor L1 provide energy to charge the capacitor C. In the closed circuit 4, the inductor L2 discharges stored energy to the second cell 31*b*.

Through the above-mentioned processes, energy of the first cell 31*a* can be transferred to the second cell 31*b*. From the perspective of cell power ("power" for short), power of the first cell 31*a* gets lower and power of the first cell 31*b* gets higher, that is, power of the first cell 31*a* is transferred to the second cell 31*b*.

It can be seen from FIG. 2 that, the Cuk circuit 22 in the implementation of the present disclosure is a Cuk circuit with a symmetric structure. In case that the voltage of the second cell 31*b* is higher than the voltage of the first ell 31*a* and energy of the second cell 31*b* needs to be transferred to the first cell 31*a*, the communication control circuit 23 can control on-off states of the switch transistor Q1 and the switch transistor Q2 in a transistor control manner opposite to that described above, so as to realize energy transfer from the second cell 31*b* to the first cell 31*a*.

It should be understood that, FIG. 2 to FIG. 4 illustrates an example of a bi-directional energy transfer between the first cell 31*a* and the second cell 31*b* with the Cuk circuit 22 that is a Cuk circuit with a symmetric structure. The implementation of the present disclosure is not limited to the above example. The Cuk circuit 22 can also be a Cuk circuit with an asymmetric structure, which is only responsible for energy-transfer from the first cell 31*a* to the second cell 31*b* or energy-transfer from the second cell 31*b* to the first cell 31*a*. For example, the switch transistor Q2 of FIG. 2 can be replaced by a free-wheeling diode. By means of such Cuk circuit, energy transfer from the first cell 31*a* to the second cell 31*b* can be achieved, but it is unable to achieve energy transfer from the second cell 31*b* to the first cell 31*a*. For another example, the switch transistor Q1 of FIG. 2 can be replaced by a free-wheeling diode. With such Cuk circuit, energy transfer from the second cell 31*b* to the first cell 31*a* can be achieved, but it is unable to achieve energy transfer from the first cell 31*a* to the second cell 31*b*.

It should be understood that, imbalance between the voltage of the first cell 31*a* and the voltage of the second cell 31*b* can be defined in various manners and is not limited herein. As an implementation, as long as present voltage and/or present power of the first cell 31*a* and present voltage and/or present power of the second cell 31*b* are not equal, the voltage of the first cell 31*a* and the voltage of the second cell 31*b* are determined as unbalanced. As another implementation, the imbalance between the voltage of the first cell 31*a* and the voltage of the second cell 31*b* can be defined as the following. The present voltage and/or present power of the first cell 31*a* and the present voltage and/or present power of the second cell 31*b* are not equal, and difference between the present voltage and/or present power of the first cell 31*a* and the present voltage and/or present power of the second cell 31*b* satisfies a certain preset condition, such as the difference between the present voltage and/or power of the first cell 31*a* and the present voltage and/or power of the second cell 31*b* being greater than a preset threshold value. Similarly, the communication control circuit 23 balancing the voltage of the first cell 31*a* and the voltage of the second cell 31*b* through the Cuk circuit 22 can be defined as follows. The communication control circuit 23 adjusts the voltage of the first cell 31*a* and the voltage of the second cell 31*b* to make the two balanced. Alternatively, the communication control circuit 23 balancing the voltage of the first cell 31*a* and the voltage of the second cell 31*b* through the Cuk circuit 22 can be defined as follows. The communication control circuit 23 reduces the difference between the present voltage and/or present power of the first cell 31*a* and the present voltage and/or present power of the second cell 31*b* to a value less than a certain preset threshold value.

Figure 5:
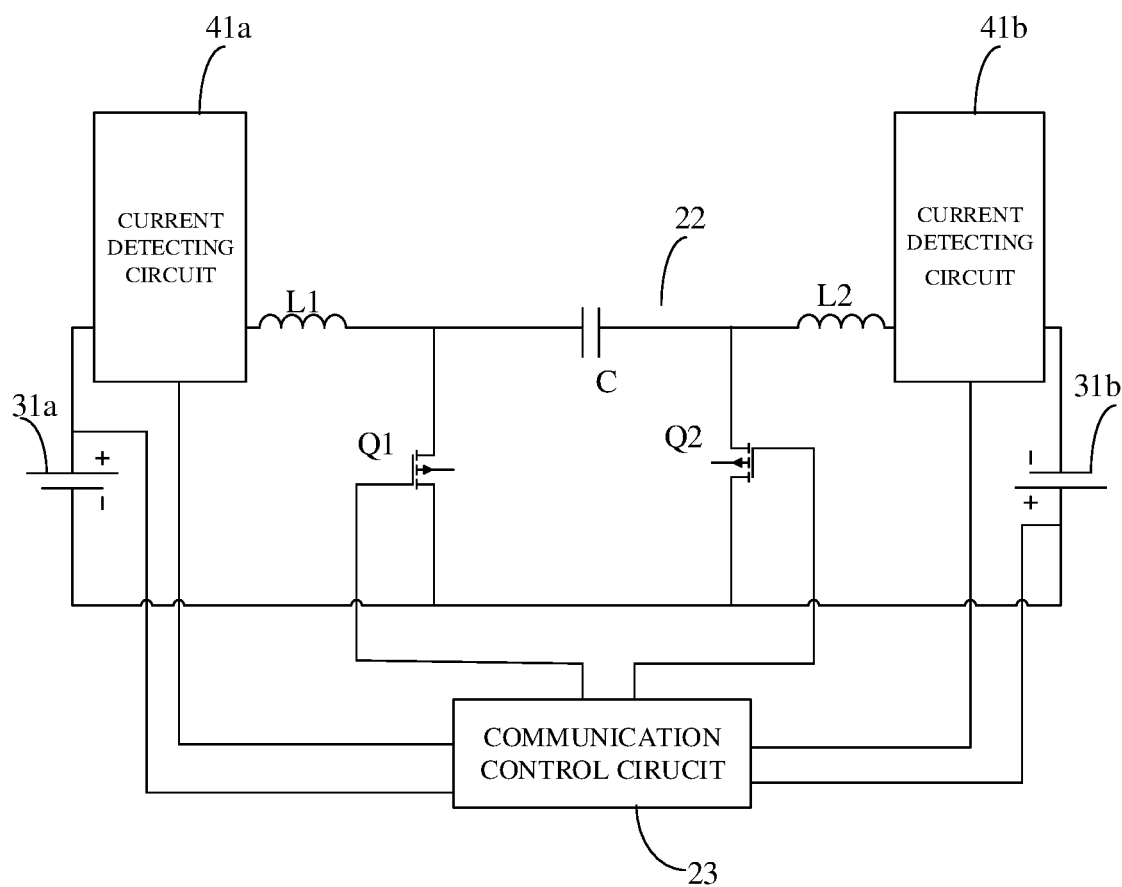
FIG. 5 is a schematic structural diagram illustrating a charging system according to another implementation of the present disclosure.

In an implementation, as illustrated in FIG. 5, the communication control circuit 23 can be coupled with a positive electrode of the first cell 31*a* and a positive electrode the second cell 31*b*, so as to detect the present voltage of the first cell 31*a* and the present voltage the second cell 31*b*. When difference between the present voltage of the first cell 31*a* and the present voltage of the second cell 31*b* is greater than a preset threshold value, the communication control circuit 23 is configured to send a drive signal to the Cuk circuit 22 to drive the Cuk circuit 22 to work. Alternatively, the communication control circuit 23 can be further configured to monitor the present power of the first cell 31*a* and the present power of the second cell 31*b*. When difference between the present power of the first cell 31*a* and the present power of the second cell 31b is greater than a preset threshold value, the communication control circuit 23 is configured to send a drive signal to the Cuk circuit 22 to drive the Cuk circuit 22 to work.

The drive signal can be, for example, a Pulse Width Modulation (PWM) signal, or other types of control signals that can control on-off states of a switch transistor.

The form of the communication control circuit 23 is not limited in implementations of the present disclosure. For instance, the communication control circuit 23 can include a microcontroller unit (MCU) and a switch-transistor driver (such as an MOS transistor driver). The MCU can be configured to communicate with the power supply device 10 and can be further configured to determine whether energy transfer between the first cell 31a and the second cell 31b is conducted or not and determine a direction of energy-transfer between the first cell 31a and the second cell 31b. In case that the MCU determines the energy transfer between the first cell 31a and the second cell 31b to be conducted and the direction of the energy transfer between the first cell 31a and the second cell 31b, the MCU can be configured to control an on-off time sequence of the switch transistor Q1 and an on-off time sequence of the switch transistor Q2 through the switch-transistor driver, so as to achieve energy transfer between the first cell 31a and the second cell 31b with the Cuk circuit.

Optionally, in some implementations, the communication control circuit 23 can be further configured to adjust duty cycle of the drive signal to adjust current in the Cuk circuit 22 during working of the Cuk circuit 22.

It should be understood that, the higher the current in the Cuk circuit 22, higher speed of the energy transfer between the first cell 31a and the second cell 31b (or power moving speed) results in the higher efficiency in balancing the voltage of the first cell 31a and the voltage of the second cell 31b.

The battery management circuit 20 in the implementation of the present disclosure can be configured to adjust the speed of the energy transfer between the first cell 31a and the second cell 31b, thereby making the battery management circuit 20 manage the voltage of the first cell 31a and the voltage of the second cell 31b in a smarter manner.

Figure 6:
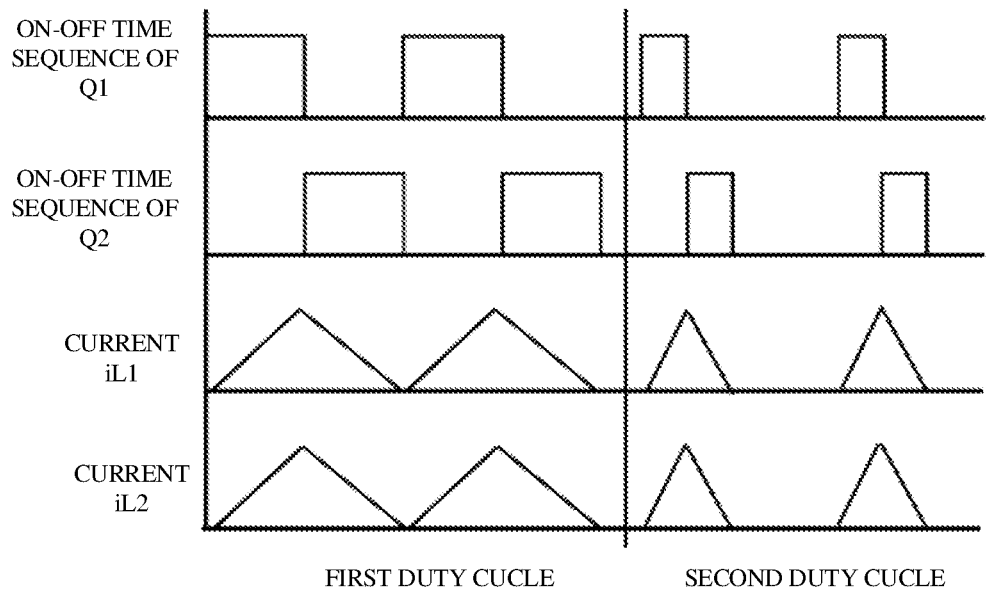
FIG. 6 is a time sequence diagram illustrating control of switch transistors of a Cuk circuit according to an implementation of the present disclosure.

As illustrated in FIG. 6, on the left is a schematic diagram of an on-off time sequence of the switch transistor Q1, an on-off time sequence of the switch transistor Q2, a waveform of current iL1, and a waveform of current iL2 when the duty cycle of the drive signal is a first duty cycle; on the right is a schematic diagram of the on-off time sequence of the switch transistor Q1, the on-off time sequence of the switch transistor Q2, a waveform of current iL1, and a waveform of current iL2 when the duty cycle of the drive signal is a second duty cycle. The first duty cycle is greater than the second duty cycle.

It can be seen from FIG. 6 that, a higher duty cycle of the drive signal corresponds to a longer switch-on time of the switch transistor Q1 and a longer switch-on time of the switch transistor Q2, a greater current in the Cuk circuit (that is, current iL1 and current iL2), and a faster energy transfer speed between the first cell 31a and the second cell 31b.

Factors that need to be taken into account when the communication control circuit 23 adjusts the duty cycle of the drive signal are not limited herein.

As an implementation, when the first cell 31a and the second cell 31b are in a working state, the communication control circuit 23 can be configured to decrease the duty cycle of the drive signal to avoid low power supply quality because of fast energy transfer between cells. When the first cell 31a and the second cell 31b are in a non-working state (that is, idle state), the communication control circuit 23 can be configured to increase the duty cycle of the drive signal.

As another implementation, one of the first cell 31a and the second cell 31b is a master cell and the other one is a slave cell. When system of the device to be charged is charged, a single-cell power supply scheme can be adopted, that is, the master cell works and the slave cell does not work. When difference between present voltage and/or present power of the master cell and present voltage and/or present power of the slave cell is great, it means that the master cell is heavily loaded. In this case, the communication control circuit 23 can be configured to increase the duty cycle of the drive signal to increase the speed of energy transfer from the slave cell to the master cell, thereby avoiding power interruption of the system caused by rapid decrease in the voltage of the master cell. On the contrary, when the difference between the present voltage and/or present power of the master cell and the present voltage and/or present power of the slave cell is small, it means that the master cell is lightly loaded. In this case, the communication control circuit 23 can be configured to decrease the duty cycle of the drive signal to transfer energy from the slave cell to the master cell at a lower speed. Lower energy transfer speed means smaller current in the Cuk circuit 22, thereby reducing heating of the Cuk circuit 22.

Optionally, in some implementations, as illustrated in FIG. 5, the battery management circuit 20 further includes a current detecting circuit 41a and a current detecting circuit 41b configured to detect the current in the Cuk circuit 22. The communication control circuit 23 can be configured to adjust the duty cycle of the drive signal to adjust the current of the Cuk circuit mentioned above as follows. The communication control circuit 23 determines a target value of the current in the Cuk circuit 22, according to the difference between the present power and/or present voltage of the first cell 31a and the present power and/or present voltage of the second cell 31b; the communication control circuit 23 adjusts the duty cycle of the drive signal to make the current in the Cuk circuit 22 detected by the current detecting circuit 41a and the current detecting circuit 41b reach the target value.

As illustrated in FIG. 3 and FIG. 4, the current in the Cuk circuit 22 can include current iL1 and iL2. It should be understood that, FIG. 5 illustrates an example in which the battery management circuit 20 includes two current detecting circuits, that is, the current detecting circuit 41a and the current detecting circuit 41b, where the current detecting circuit 41a is configured to detect current iL1 in the Cuk circuit 22 and the current detecting circuit 41b is configured to detect current iL2 in the Cuk circuit 22. However, the implementation of the present disclosure is not limited to the above example. In some implementations, the battery management circuit 20 can include only one of the two current detecting circuits 41a and 41b.

Suppose one of the first cell 31a and the second cell 31b is a master cell and the other one is a slave cell, where the master cell is configured to supply power to a system. When difference between the present voltage and/or present power of the first cell 31a and the present voltage and/or present power of the second cell 31b is great, it means that the master cell is heavily loaded, and the current in the Cuk circuit 22 can be increased in this case. When the difference between the present voltage and/or present power of the first cell 31a and the present voltage and/or present power of the second cell 31b is small, it means that the master cell is lightly loaded, and the current in the Cuk circuit 22 can be decreased in this case.

The manner in which the communication control circuit 23 determines the target value of the current in the Cuk circuit 22 according to the difference between the present voltage and/or present power of the first cell 31a and the present voltage and/or present power of the second cell 31b is not limited herein. As an implementation, a correspondence relationship between the difference between the present voltage and/or present power of the first cell 31a and the present voltage and/or present power of the second cell 31b and the current in the Cuk circuit 22 can be preset. In practice, the target value of the current in the Cuk circuit 22 corresponding to the difference between the present voltage and/or present power of the first cell 31a and the present voltage and/or present power of the second cell 31b can be determined according to the above correspondence relationship. As another implementation, the difference between the present voltage and/or present power of the first cell 31a and the present voltage and/or present power of the second cell 31b and other factors such as temperature of the device to be charged (or the battery of the device to be charged) can be comprehensively taken into account to determine the target value of the current in the Cuk circuit 22. For example, when the difference between the present voltage and/or present power of the first cell 31a and the present voltage and/or present power of the second cell 31b is great, but the temperature of the battery of the device to be charged is also high, the target value of the current in the Cuk circuit 22 can be set smaller to avoid further increase in temperature of the device to be charged (or the battery of the device to be charged). When the difference between the present voltage and/or present power of the first cell 31a and the present voltage and/or present power of the second cell 31b is great and the temperature of the battery of the device to be charged is low, the target value of the current in the Cuk circuit 22 can be set greater to increase efficiency in balancing the voltage of the first cell 31a and the voltage of the second cell 31b.

Figure 7:
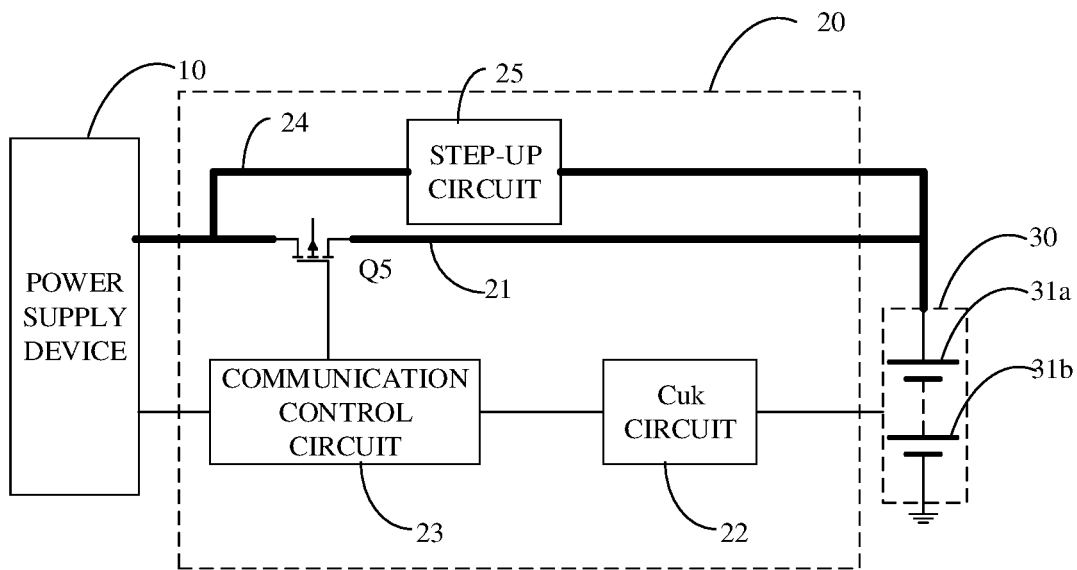
FIG. 7 is a schematic structural diagram illustrating a charging system according to yet another implementation of the present disclosure.

Optionally, in some implementations, as illustrated in FIG. 7, the battery management circuit 20 can further include a second charging channel 24. The second charging channel is provided with a boost circuit 25. The boost circuit 25 is configured to receive initial voltage from the power supply device 10 and increase the initial voltage to a target voltage to charge the battery 30 according to the target voltage when the power supply device 10 charges the battery 30 through the second charging channel 24. The initial voltage is lower than total voltage of the battery 30 and the target voltage is higher than the total voltage of the battery 30. The communication control circuit 23 is further configured to control switching between the first charging channel 21 and the second charging channel 24.

It can be understood from above that, direct charging is conducted on cells of the battery 30 through the first charging channel 21, and direct charging requires that charging voltage received from the power supply device 10 be higher than total voltage of cells coupled in series of the battery. For example, as to two cells coupled in series, suppose present voltage of each cell is 4V, when the two cells are charged through the first charging channel 21, the charging voltage received from the power supply device 10 is required to be at least higher than 8V. However, output-voltage of a conventional power supply device is usually unable to reach 8V (for example, a conventional adaptor usually provides an output-voltage of 5V), which results in the conventional power supply device being unable to charge the battery 30 through the first charging channel 21. In order to make the above direct charging circuit be compatible with the conventional power supply device, such as a conventional power adaptor, the second charging channel 24 is provided herein. The second charging channel 24 is provided with a boost circuit 25, and the boost circuit 25 is configured to increase the initial voltage received from the power supply device 10 to a target voltage to make the target voltage be higher than the total voltage of the battery 30, so as to solve the problem of the conventional power supply device being unable to charge the battery 30 with multiple cells coupled in series according to the implementations of the disclosure.

The configuration of the boost circuit 25 is not limited herein. For instance, a Boost circuit or a charge pump can be adopted to increase voltage. Optionally, in some implementations, a conventional charging channel design can be adopted for the second charging channel 24, that is, the second charging channel 24 can be provided with a conversion circuit, such as a charging IC. The conversion circuit can be configured to take constant-voltage and constant-current control of the charging process of the battery 30 and adjust (such as increase or decrease) the initial voltage received from the power supply device 10 according to actual needs. In the implementations of the disclosure, the initial voltage received from the power supply device 10 can be increased to the target voltage by utilizing a boost function of the conversion circuit.

The communication control circuit 23 can achieve switching between the first charging channel 21 and the second charging channel 24 through a switch component. Specifically, as illustrated in FIG. 7, the first charging channel 21 is provided with a switch transistor Q5. When the communication control circuit 23 controls the switch transistor Q5 to switch-on, the first charging channel 21 works and direct charging is conducted on the battery 30 through the first charging channel 21. When the communication control circuit 23 controls the switch transistor Q5 to switch-off, the second charging channel 24 works and charging is conducted on the battery 30 through the second charging channel 24.

Figure 8:
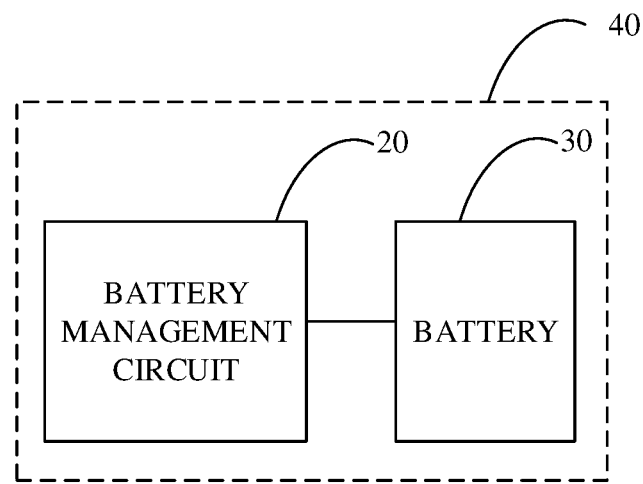
FIG. 8 is a schematic structural diagram illustrating a device to be charged according to an implementation of the present disclosure.

In an implementation of the disclosure, a device to be charged is provided. As illustrated in FIG. 8, the device to be charged 40 can include the battery management circuit 20 and the battery 30 described above.

At present, a single-cell power supply scheme is generally adopted during charging of a system of a device to be charged (such as a terminal). Multiple cells coupled in series are proposed in implementations of the disclosure. Total voltage of the multiple cells is high and is therefore unsuitable to be used directly to supply power to the device to be charged. In order to solve this problem, a practical scheme is to adjust working voltage of the system of the device to be charged, so as to enable the system of the device to be charged to support multiple-cell power supply. However, this scheme results in too many modifications to the device to be charged and high cost.

Optionally, in some implementations, the device to be charged 40 can be provided with a buck circuit, so as to make decreased voltage meet requirements of the device to be charged 40 on power supply voltage.

For example, working voltage of a single cell is 3.0V to 4.35V. In order to guarantee normal power supply voltage of the system of the device to be charged, the buck circuit can decrease (that is, step down) the total voltage of the battery 30 to a value between 3.0V and 4.35V. The buck circuit can be implemented in various manners, such as a Buck circuit, a charge pump, etc., to decrease voltage.

Optionally, in other implementations, a power supply circuit of the device to be charged 40 has an input end that can be coupled with both ends of any one single cell of the battery 30. The power supply circuit can supply power to the system of the device to be charged 40 according to voltage of the one single cell.

It should be understood that, voltage decreased by the buck circuit may have ripples and in turn influence power supply quality of the device to be charged. The implementation of the disclosure still adopts one single cell to supply power to the system of the device to be charged, due to steady voltage output by one single cell. Therefore, in the implementation of the disclosure, while a problem of how to supply power in a multiple-cell scheme is solved, power supply quality of the system of the device to be charged can be guaranteed.

When one single cell is adopted to supply power, imbalance of voltage between different cells of the battery 30 may occur. The imbalance of voltage between different cells can cause difficulty in battery management. In addition, difference in parameters of cells of the battery can result in decrease in service life of the battery. In the implementation of the disclosure, the Cuk circuit 22 is configured to balance voltage between cells, thereby keeping voltage between the cells of the battery 30 balanced even if the above single-cell power supply scheme is adopted.

With output power of the power supply device increasing, when the power supply device charges the cells of the device to be charged, lithium precipitation may occur, which deceases service life of the cells.

Figure 9:
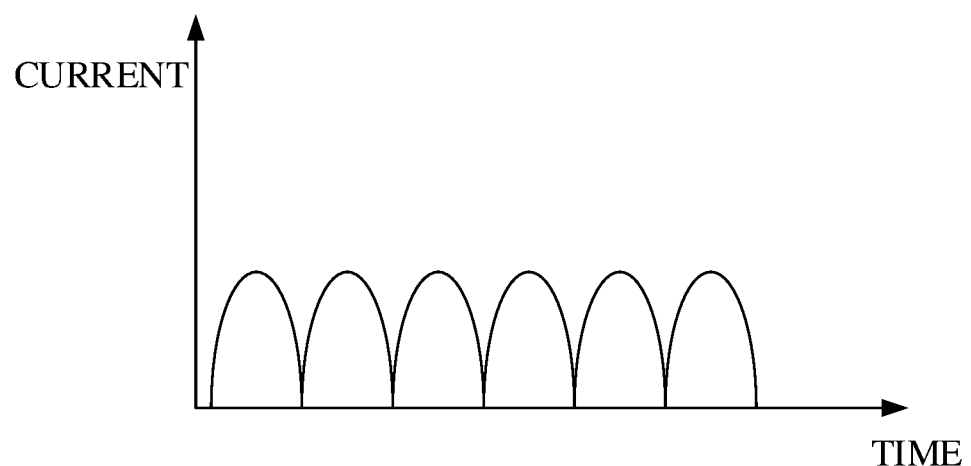
FIG. 9 is a schematic diagram illustrating a waveform of a pulsating direct current (DC) current according to an implementation of the present disclosure.

In order to improve reliability and safety of the cells, in some implementations, the power supply device 10 can be controlled to output a pulsating DC current (also referred to as a one-way pulsating output-current, a pulsating waveform current, or a steamed bun wave current). Since the direct charging manner is adopted to charge the battery 30 through the first charging channel 21, the pulsating DC current received from the power supply device 10 can be applied directly to the battery 30. As illustrated in FIG. 9, magnitude of the pulsating DC current varies periodically. Compared with a constant DC current, the pulsating DC current can reduce lithium precipitation of a cell, thereby increasing service life of the cell. In addition, compared with the constant DC current, the pulsating DC current can decrease possibility and intensity in arcing of a contact of a charging interface, thereby increasing service life of the charging interface.

Adjusting charging current output by the power supply device 10 to the pulsating DC current can be implemented in various manners. For example, a primary filtering circuit and a secondary filtering circuit of the power supply device 10 can be removed, so as to make the power supply device 10 output the pulsating DC current.

Optionally, in some implementations, the charging current received from the power supply device 10 by the first charging channel 21 can be an AC current, for example, a primary filtering circuit, a secondary rectifying circuit, and a secondary filtering circuit of the power supply device 10 can be removed to make the power supply device 10 output the AC current. The AC current can also reduce lithium precipitation of the cell and increase the service life of the cell.

Optionally, in some implementations, the power supply device 10 is selectively operable in a first charging mode or a second charging mode. Charging speed of the power supply device 10 charging the battery 30 in the second charging mode is faster than that of the power supply device 10 charging the battery 30 in the first charging mode. In other words, compared with the power supply device 10 working in the first charging mode, the power supply device 10 working in the second charging mode takes less time to charge a battery of the same capacity. In addition, in some implementations, in the first charging mode, the power supply device 10 charges the battery 30 through the second charging channel 24; in the second charging mode, the power supply device 10 charges the battery 30 through the first charging channel 21.

The first charging mode can be a normal charging mode. The second charging mode can be a quick charging mode. In the normal charging mode, the power supply device outputs smaller current (usually lower than 2.5 A) or adopts low power (usually lower than 15 W) to charge the battery of the device to be charged. In the normal charging mode, charging fully a battery of high capacity (such as a 3000 mA battery) usually takes several hours. In the quick charging mode, the power supply device can output greater current (usually higher than 2.5 A, such as 4.5 A, 5 A, or even higher) or adopt higher power (usually higher than or equal to 15 W) to charge the battery of the device to be charged. Compared with the normal charging mode, in the quick charging mode, the power supply device can charge fully the battery of the same capacity within a substantially shorter charging period and at a higher charging speed.

In addition, the communication control circuit 23 can be configured to conduct two-way communication with the power supply device 10 (that is, communicate bi-directionally), to control output of the power supply device 10 in the second charging mode, that is, to control the charging voltage and/or charging current provided by the power supply device 10 in the second charging mode. The device to be charged 40 can include a charging interface. The communication control circuit 23 communicates with the power supply device 10 through a data line of the charging interface. For instance, the charging interface can be a USB interface. The data line can be a D+ line and/or a D− line of the USB interface. Alternatively, the device to be charged 40 can also be configured to conduct wireless communication with the power supply device 10.

Content communicated between the power supply device 10 and the communication control circuit 23 and control manners of the communication control circuit 23 on output of the power supply device 10 in the second charging mode are not limited herein. For example, the communication control circuit 23 can communicate with the power supply device 10, interact with present total voltage and/or present power of the battery 30 of the device to be charged 40, and adjust output-voltage and/or output-current of the power supply device 10 according to the present total voltage and/or present power of the battery 30. The following will describe in detail the content communicated between the communication control circuit 23 and the power supply device 10 and the control manners of the communication control circuit 23 on output of the power supply device 10 in the second charging mode in conjunction with implementations of the disclosure.

Description above does not limit master-slave relationship between the power supply device 10 and the device to be charged (or the communication control circuit 23 of the device to be charged). That is to say, any one of the power supply device 10 and the device to be charged can function as a master device to initiate a two-way communication, and correspondingly the other one of the power supply device 10 and the device to be charged can function as a slave device to make a first response or a first reply to the communication initiated by the master device. As a practical manner, identities of the master device and the slave device can be determined by comparing levels of the power supply device 10 and the device to be charged with reference to earth in a communication process.

The implementation of the two-way communication between the power supply device 10 and the device to be charged is not limited herein. In other words, any one of the power supply device 10 and the device to be charged can function as the master device to initiate the communication, and correspondingly the other one of the power supply device 10 and the device to be charged can function as the slave device to make the first response or the first reply to the communication initiated by the master device. Besides, the master device can make a second response to the first response or the first reply of the slave device, as such, the master device and the slave device complete a negotiation on charging modes. As a possible implementation, charging between the master device and the slave device can be executed after completion of multiple negotiations on charging modes between the master device and the slave device, so as to guarantee that the charging process is safe and reliable after negotiation.

The master device can make the second response to the first response or the first reply to the communication of the slave device as follows. The master device receives from the slave device the first response or the first reply to the communication and make the second response to the first response or the first reply of the slave device. As an example, when the master device receives from the slave device the first response or the first reply to the communication within a preset time period, the master device can make the second response to the first response or the first reply of the slave device as follows. The master device and the slave device complete a negotiation on charging modes. Charging between the master device and the slave device is executed in the first charging mode or in the second charging mode according to the negotiation result, that is, the power supply device 10 is operable in the first charging mode or in the second charging mode to charge the device to be charged according to the negotiation.

The master device can make the second response to the first response or the first reply to the communication of the slave device as follows. When the master device fails to receive from the slave device the first response or the first reply to the communication within a preset time period, the master device can still make the second response to the first response or the first reply made by the slave device. As an example, when the master device fails to receive from the slave device the first response or the first reply to the communication within a preset time period, the master device can still make the second response to the first response or the first reply made by the slave device as follows: the master device and the slave device complete a negotiation on charging modes. Charging is executed in the first charging mode between the master device and the slave device, that is, the power supply device is operable in the first charging mode to charge the device to be charged.

Optionally, in some implementations, after the device to be charged, as the master device, initiates the communication and the power supply device 10, as the slave device, makes the first response or the first reply to the communication initiated by the master device, without the device to be charged making the second response to the first response or the first reply of the power supply device 10, it can be regarded as the master device and the slave device completing a negotiation on charging modes, and thus the power supply device 10 can determine to charge the device to be charged in the first charging mode or in the second charging mode according to the negotiation.

Optionally, in some implementations, the communication control circuit 23 conducts two-way communication with the power supply device 10, so as to control output of the power supply device 10 in the second charging mode as follows. The communication control circuit 23 conducts two-way communication with the power supply device 10, so as to negotiate charging modes between the power supply device 10 and the device to be charged.

Optionally, in some implementations, the communication control circuit 23 conducts two-way communication with the power supply device 10 to negotiate charging modes between the power supply device 10 and the device to be charged as follows. The communication control circuit 23 receives a first instruction from the power supply device 10, the first instruction is for enquiring whether the device to be charged enables (in other words, switches on) the second charging mode; the communication control circuit 23 sends a reply instruction of the first instruction to the power supply 10, the reply instruction of the first instruction is for indicating whether the device to be charged agrees to enable the second charging mode; in case that the device to be charged agrees to enable the second charging mode, the communication control circuit 23 controls the power supply device 10 to charge the battery 30 though the first charging channel 21.

Optionally, in some implementations, the communication control circuit 23 conducts two-way communication with the power supply device 10 to control output of the power supply device 10 in the second charging mode as follows. The communication control circuit 23 conducts two-way communication with the power supply device 10, so as to determine charging voltage which is output by the power supply device in the second charging mode and for charging the device to be charged.

Optionally, in some implementations, the communication control circuit 23 conducts two-way communication with the power supply device 10, so as to determine charging voltage which is output by the power supply device for charging the device to be charged as follows. The communication control circuit 23 receives a second instruction from the power supply device 10, the second instruction is for enquiring whether the charging voltage output by the power supply device 10 matches present total voltage of the battery 30 of the device to be charged; the communication control circuit 23 sends a reply instruction of the second instruction to the power supply 10, the reply instruction of the second instruction is for indicating that the voltage output by the power supply device 10 matches the present total voltage of the battery 30 or does not match, that is, is at higher levels, or is at lower levels. Alternatively, the second instruction can be for enquiring whether it is suitable to use present output-voltage of the power supply device 10 as the charging voltage, which is output by the power supply device 10 in the second charging mode for charging the device to be charged. The reply instruction of the second instruction is for indicating whether the present output-voltage of the power supply device 10 is suitable or unsuitable, that is, at higher levels or at lower levels. The present output-voltage of the power supply device 10 matching the present total voltage of the battery 30, or the present output-voltage of the power supply device 10 being suitable to be used as the charging voltage which is output by the power supply device 10 in the second charging mode for charging the device to be charged can be understood as follows. The present output-voltage of the power supply device 10 is slightly higher than the present total voltage of the battery, and the difference between the output-voltage of the power supply device 10 and the present total voltage of the battery is within a preset range (usually at a level of several hundred millivolts (mV)).

Optionally, in some implementations, the communication control circuit 23 can conduct two-way communication with the power supply device 10, so as to control output of the power supply device 10 in the second charging mode as follows. The communication control circuit 23 conducts two-way communication with the power supply device 10, so as to determine charging current which is output by the power supply device 10 in the second charging mode for charging the device to be charged.

Optionally, in some implementations, the communication control circuit 23 can conduct two-way communication with the power supply device 10 to determine charging current which is output by the power supply device 10 in the second charging mode for charging the device to be charged as follows. The communication control circuit 23 receives a third instruction sent by the power supply device 10, the third instruction is for enquiring a maximum charging current the device to be charged supports; the communication control circuit 23 sends a reply instruction of the third instruction to the power supply device 10, the reply instruction of the third instruction is for indicating the maximum charging current the device to be charged supports, so that the power supply device 10 can determine the charging current which is output by the power supply device 10 in the second charging mode for charging the device to be charged, according to the maximum charging current the device to be charged supports. It should be understood that, the communication control circuit 23 determining the charging current which is output by the power supply device 10 in the second charging mode for charging the device to be charged according to the maximum charging current the device to be charged supports can be implemented in various manners. For example, the power supply device 10 can determine the maximum charging current the device to be charged supports as the charging current which is output by the power supply device 10 in the second charging mode for charging the device to be charged, or comprehensively take into account the maximum charging current the device to be charged supports and other factors such as current output capability of the power supply device 10 itself to determine the charging current which is output by the power supply device 10 in the second charging mode for charging the device to be charged.

Optionally, in some implementations, the communication control circuit 23 conducts two-way communication with the power supply device 10 to control output of the power supply device 10 in the second charging mode as follows. The communication control circuit 23 conducts two-way communication with the power supply device 10 to adjust output-current of the power supply device 10 in the second charging mode.

Specifically, the communication control circuit 23 conducts two-way communication with the power supply device 10 to adjust the output-current of the power supply device 10 as follows. The communication control circuit 23 receives a fourth instruction from the power supply device 10, the fourth instruction is for enquiring present total voltage of the battery; the communication control circuit 23 sends a reply instruction of the fourth instruction to the power supply device 10, the reply instruction of the fourth instruction is for indicating the present total voltage of the battery, so that the power supply device 10 can adjust the output-current of the power supply device 10 according to the present total voltage of the battery.

Optionally, in some implementations, the communication control circuit 23 conducts two-way communication with the power supply device 10, so as to control output of the power supply device 10 in the second charging mode as follows. The communication control circuit 23 conducts two-way communication with the power supply device 10 to determine whether there is contact failure in a charging interface.

Specifically, the communication control circuit 23 can conduct two-way communication with the power supply device 10 to determine whether there is contact failure in the charging interface as follows. The communication control circuit 23 receives a fourth instruction sent by the power supply device 10, the fourth instruction is for enquiring present voltage of the battery of the device to be charged; the communication control circuit 23 sends a reply instruction of the fourth instruction to the power supply device 10, the reply instruction of the fourth instruction is for indicating the present voltage of the battery of the device to be charged, so that the power supply device 10 can determine whether there is contact failure in the charging interface according to output-voltage of the power supply 10 and the present voltage of the battery of the device to be charged. For instance, in case that the power supply device 10 determines that difference between the output-voltage of the power supply 10 and the present voltage of the battery of the device to be charged is greater than a preset voltage threshold value, it indicates that impedance, which is obtained by the difference (that is, the difference between the output-voltage of the power supply 10 and the present voltage of the battery of the device to be charged) divided by output-current of the power supply device 10, is greater than a preset impedance threshold value, it can be determined that there is contact failure in the charging interface.

Optionally, in some implementations, contact failure in the charging interface can be determined by the device to be charged. For example, the communication control circuit 23 sends a sixth instruction to the power supply device 10, the sixth instruction is for enquiring output-voltage of the power supply device 10; the communication control circuit 23 receives a reply instruction of the sixth instruction from the power supply device 10, the reply instruction of the sixth instruction is for indicating the output-voltage of the power supply device 10, the communication control circuit 23 determines whether there is contact failure in the charging interface according to present voltage of the battery and the output-voltage of the power supply 10. When the communication control circuit 23 determines that there is contact failure in the charging interface, the communication control circuit 23 can send a fifth instruction to the power supply device 10, the fifth instruction is for indicating contact failure in the charging interface. After receiving the fifth instruction, the power supply device 10 can exit the second charging mode.

The following will describe in detail a communication process between the power supply device 10 and the device to be charged 40 (the communication control circuit 23 of the device to be charged 40, to be specific) in conjunction with FIG. 10. It should be noted that, the example of FIG. 10 is just for those skilled in the art to understand the implementations of the disclosure, instead of limiting the implementations of the disclosure to specific numeric values or specific situations of the example. Those skilled in the art can make various equivalent modifications and changes without departing from the scope of the implementation of the disclosure.

As illustrated in FIG. 10, the communication procedure between the power supply device 10 and the device to be charged 40 (also referred to as the communication procedure of a quick charging process) can include the following five stages.

Stage 1:

After the device to be charged 40 is coupled with the power supply device 10, the device to be charged 40 can detect the type of the power supply device 10 though data line D+ and data line D−. When the power supply device 10 is detected to be a power supply device specially configured to charge such as an adaptor, current absorbed by the device to be charged 40 can be greater than a preset current threshold value I2 (can be 1 A, for example). When the power supply device 10 detects that output-current of the power supply device 10 is greater than or equal to I2 within a preset duration (can be a continuous time period T1, for example), the power supply device 10 can consider that identification of the type of the power supply device by the device to be charged 40 is completed. Next, the power supply device 10 begins a negotiation process with the device to be charged 40 and send Instruction 1 (corresponding to the first instruction mentioned above), so as to enquire whether the device to be charged 40 agrees to be charged by the power supply device 10 in the second charging mode.

When the power supply device 10 receives a reply instruction of Instruction 1 and the reply instruction of Instruction 1 indicates that the device to be charged 40 disagrees to be charged by the power supply device 10 in the second charging mode, the power supply device 10 detects once again the output-current of the power supply device 10. When the output-current of the power supply device 10 is still greater than or equal to I2 within a preset continuous duration (can be a continuous time period T1), the power supply device 10 sends once again Instruction 1 to enquire whether the device to be charged 40 agrees to be charged by the power supply device 10 in the second charging mode. The power supply device 10 repeats the above operations at Stage 1 until the device to be charged 40 agrees to be charged by the power supply device 10 in the second charging mode, or the output-current of the power supply device 10 is no longer greater than or equal to I2.

When the device to be charged 40 agrees to be charged by the power supply device 10 in the second charging mode, the communication procedure proceeds to Stage 2.

Stage 2:

The output-voltage of the power supply device 10 can include multiple grades. The power supply device 10 sends Instruction 2 (corresponding to the second instruction mentioned above) to enquire whether the output-voltage of the power supply device 10 (present output-voltage) matches present voltage of the battery 30 of the device to be charged 40.

The device to be charged 40 sends a reply instruction of Instruction 2 to indicate whether the output-voltage of the power supply device 10 matches the present voltage of the battery 30 of the device to be charged 40, is at higher levels, or is at lower levels. When the reply instruction of Instruction 2 indicates that the output-voltage of the power supply device 10 is at higher levels or is at lower levels, the power supply device 10 can adjust the output-voltage of the power supply device 10 by one grade and send once again Instruction 2 to the device to be charged 40 to enquire whether the output-voltage of the power supply device 10 matches the present voltage of the battery. Repeat the above steps until the device to be charged 40 determines that the output-voltage of the power supply device 10 matches the present voltage of the battery 30 of the device to be charged 40 and proceed to Stage 3.

Stage 3:

The power supply device 10 sends Instruction 3 (corresponding to the third instruction mentioned above) to enquire a maximum charging current the device to be charged 40 supports. The device to be charged 40 sends a reply instruction of Instruction 3 to indicate the maximum charging current the device to be charged 40 supports. Proceed to Stage 4.

Stage 4:

The power supply device 10 determines, according to the maximum charging current the device to be charged 40 supports, the charging current which is output by the power supply device 10 in the second charging mode for charging the device to be charged 40. Proceed to Stage 5, that is, the constant-current charging stage.

Stage 5:

After proceeding to the constant-current charging stage, the power supply device 10 can send Instruction 4 (corresponding to the fourth instruction mentioned above) to the device to be charged 40 at certain time intervals, so as to enquire present voltage of the battery 30 of the device to be charged 40. The device to be charged 40 can send a reply instruction of Instruction 4 to feed back the present voltage of the battery. The power supply device 10 can determine whether the charging interface is in a good contact and whether it is necessary to reduce the output-current of the power supply device 10, according to the present voltage of the battery. When the power supply device 10 determines that there is contact failure in the charging interface, the power supply device 10 can send Instruction 5 (corresponding to the fifth instruction mentioned above), thereby exiting the second charging mode and being reset to return to Stage 1.

Optionally, in some implementations, at Stage 1, when the device to be charged 40 sends the reply instruction of Instruction 1, the reply instruction of Instruction 1 can carry path impedance data (or information) of the device to be charged 40. The path impedance data of the device to be charged 40 can be configured to determine whether the charging interface is in a good contact in the stage five.

Optionally, in some implementations, at Stage 2, duration from when the device to be charged 40 agrees to be charged by the power supply device 10 in the second charging mode to when the power supply device 10 adjusts the output-voltage thereof to a suitable charging voltage can be controlled within a certain range. When the duration is beyond the certain range, the power supply device 10 or the device to be charged 40 can determine that the communication process is abnormal, being reset to return to Stage 1.

Optionally, in some implementations, at Stage 2, when the output-voltage of the power supply device 10 is higher than the present voltage of the battery of the device to be charged 40 by ΔV (ΔV can be set between 200 mV and 500 mV), the device to be charged 40 can send the reply instruction of Instruction 2 to indicate that the output-voltage of the power supply device 10 matches the voltage of the battery of the device to be charged 40.

Optionally, in some implementations, at Stage 4, adjusting speed of the output-current of the power supply device 10 can be controlled within a certain range, so as to avoid abnormality of the charging process resulting from excessively high adjusting speed.

Optionally, in some implementations, at Stage 5, change magnitude of the output-current of the power supply device 10 can be controlled within 5%.

Optionally, in some implementations, at Stage 5, the power supply device 10 can detect in real time impedance of charging path. Specifically, the power supply device 10 can detect the impedance of charging path according to the output-voltage and the output-current of the power supply device 10 and the present voltage of the battery fed back by the device to be charged 40. When the impedance of charging path is higher than the impedance of path of the device to be charged 40 plus impedance of a charging cable, it indicates that there is contact failure in the charging interface, and thus the power supply device 10 stops charging the device to be charged 40 in the second charging mode.

Optionally, in some implementations, after the power supply device 10 enables the second charging mode to charge the device to be charged 40, time intervals of communication between the power supply device 10 and the device to be charged 40 can be controlled within a certain range, to avoid abnormality of communication resulting from excessively short time intervals of communication.

Optionally, in some implementations, stopping of the charging process (or stopping of the power supply device 10 charging the device to be charged 40 in the second charging mode) can include a recoverable stopping and a non-recoverable stopping.

For example, when it is detected that the battery of the device to be charged 40 is fully charged or there is contact failure in the charging interface, the charging process stops, a charging communication process is reset, and the charging process enters again Stage 1. Then, when the device to be charged 40 disagrees to be charged by the power supply device 10 in the second charging mode, the communication procedure will not proceed to Stage 2. The stopping of the charging process in this case can be considered as the non-recoverable stopping.

For another example, when there is abnormality of the communication between the power supply device 10 and the device to be charged 40, the charging process stops, the charging communication process is reset, and the charging process enters again Stage 1. After requirements on Stage 1 are satisfied, the device to be charged 40 agrees to be charged by the power supply device 10 in the second charging mode, so as to recover the charging process. The stopping of the charging process in this case can be considered as the recoverable stopping.

For yet another example, when the device to be charged 40 detects abnormality of the battery, the charging process stops, is reset, and enters again Stage 1. Then, the device to be charged 40 disagrees to be charged by the power supply device 10 in the second charging mode. After the battery returns to normal and the requirements on Stage 1 are satisfied, the device to be charged 40 agrees to be charged by the power supply device 10 in the second charging mode. The stopping of the quick charging process in this case can be considered as the recoverable stopping.

The above communication steps or operations of FIG. 10 are just illustrative. For instance, at Stage 1, after the device to be charged 40 is coupled with the power supply device 10, handshake communication between the device to be charged 40 and the power supply device 10 can also be initiated by the device to be charged 40. In other words, the device to be charged 40 sends Instruction 1, to enquire whether the power supply device 10 enables the second charging mode. Thereafter, the device to be charged 40 receives a reply instruction from the power supply device 10 indicating that the power supply device 10 agrees to charge the device to be charged 40 in the second charging mode. After sending the reply instruction responsive to Instruction 1, the power supply device 10 begins to charge the battery of the device to be charged 40 in the second charging mode.

For another instance, after Stage 5, the communication procedure can further include the constant-voltage charging stage. Specifically, in Stage 5, the device to be charged 40 can feed back the present voltage of the battery to the power supply device 10. When the present voltage of the battery reaches a threshold value of charging voltage in the constant-voltage charging stage, the charging stage turns to the constant-voltage charging stage from the constant-current charging stage. In the constant-voltage charging stage, the charging current gradually decreases. When the charging current decreases to a certain threshold value, it indicates that the battery of the device to be charged 40 is fully charged, and thus the whole charging process is completed and stopped.

Apparatus implementations of the disclosure are described in detail above in conjunction with FIG. 1 to FIG. 10. The following will describe in detail method implementations of the disclosure in conjunction with FIG. 11. It should be understood that, description of method and description of apparatus correspond to each other. For simplicity, repeated description will be properly omitted.

FIG. 11 is a schematic flowchart illustrating a battery management method according to an implementation of the present disclosure. The battery management method of FIG. 11 is applicable to a battery management circuit. The battery management circuit can be, for example, the battery management circuit 20 described above. The battery management circuit can include a first charging channel and a Cuk circuit. Charging voltage and/or charging current is received from a power supply device through the first charging channel and is provided to a battery directly through the first charging channel, and the battery includes a first cell and a second cell coupled in series. The battery management circuit may further include a communication control circuit, which is configured to communicate with the power supply device and internal components of the battery management circuit.

The battery management method includes operations at blocks 1110 to 1120. The following will describe each of the operations of FIG. 11 in detail.

At block 1110, communicate with the power supply device, to make magnitude of the charging voltage and/or charging current match a present charging stage of the battery, when the power supply device charges the battery through the first charging channel. This process can be conducted by the battery management circuit.

At block 1120, send a drive signal to the Cuk circuit to drive the Cuk circuit to work, to make energy of the first cell and the second cell be transferred through the Cuk circuit to balance voltage of the first cell and voltage of the second cell, when the voltage of the first cell and the voltage of second cell are unbalanced. This process can be conducted by the battery management circuit.

Optionally, in some implementations, before sending the drive signal to the Cuk circuit to drive the Cuk circuit to work, the battery management method can further include the following: acquire present power and/or present voltage of the first cell and present power and/or present voltage of the second cell. The sending the drive signal to the Cuk circuit to drive the Cuk circuit to work includes the following: send the drive signal to the Cuk circuit to drive the Cuk circuit to work when a difference between the present power and/or present voltage of the first cell and the present power and/or present voltage of the second cell is greater than a preset threshold value.

Optionally, in some implementations, the battery management method further includes the following: adjust duty cycle of the drive signal to adjust current in the Cuk circuit, during working of the Cuk circuit.

Optionally, in some implementations, the battery management circuit further includes a current detecting circuit configured to detect the current in the Cuk circuit. The adjusting the duty cycle of the drive signal to adjust the current in the Cuk circuit includes the following: determine a target value of the current in the Cuk circuit according to the difference between the present power and/or present voltage of the first cell and the present power and/or present voltage of the second cell; adjust the duty cycle of the drive signal to make the current in the Cuk circuit detected by the current detecting circuit reach the target value.

Optionally, in some implementations, the battery management circuit can further include a second charging channel provided with a boost circuit, and the boost circuit is configured to receive initial voltage from the power supply device and increase the initial voltage to a target voltage to charge the battery according to the target voltage, when the power supply device charges the battery through the second charging channel. The initial voltage is lower than total voltage of the battery and the target voltage is higher than the total voltage of the battery. The battery management method can further include the following: control switching between the first charging channel and the second channel.

The above identified various processes can be conducted by the communication control circuit.

Those of ordinary skill in the art will appreciate that units (including sub-units) and algorithmic operations of various examples described in connection with implementations herein can be implemented by electronic hardware or by a combination of computer software and electronic hardware. Whether these functions are performed by means of hardware or software depends on the application and the design constraints of the associated technical solution. A professional technician may use different methods with regard to each particular application to implement the described functionality, but such methods should not be regarded as lying beyond the scope of the disclosure.

It will be evident to those skilled in the art that the corresponding processes of the above method implementations can be referred to for the working processes of the foregoing systems, apparatuses, and units, for purposes of convenience and simplicity and will not be repeated herein.

It will be appreciated that the systems, apparatuses, and methods disclosed in implementations herein may also be implemented in various other manners. For example, the above apparatus implementations are merely illustrative, e.g., the division of units (including sub-units) is only a division of logical functions, and there may exist other ways of division in practice, e.g., multiple units (including sub-units) or components may be combined or may be integrated into another system, or some features may be ignored or not included. In other respects, the coupling or direct coupling or communication connection as illustrated or discussed may be an indirect coupling or communication connection through some interface, device or unit, and may be electrical, mechanical, or otherwise.

Separated units (including sub-units) as illustrated may or may not be physically separated. Components or parts displayed as units (including sub-units) may or may not be physical units, and may reside at one location or may be distributed to multiple networked units. Some or all of the units (including sub-units) may be selectively adopted according to practical needs to achieve desired objectives of the disclosure.

Additionally, various functional units (including sub-units) described in implementations herein may be integrated into one processing unit or may be present as a number of physically separated units, and two or more units may be integrated into one.

If the integrated units are implemented as software functional units and sold or used as standalone products, they may be stored in a computer readable storage medium. Based on such an understanding, the essential technical solution, or the portion that contributes to the prior art, or all or part of the technical solution of the disclosure may be embodied as software products. Computer software products can be stored in a storage medium and may include multiple instructions that, when executed, can cause a computing device, e.g., a personal computer, a server, a second adapter, a network device, etc., to execute some or all operations of the methods as described in the various implementations. The above storage medium may include various kinds of media that can store program code, such as a USB flash disk, a mobile hard drive, a read-only memory (ROM), a random access memory (RAM), a magnetic disk, or an optical disk.

What is claimed is:

1. A battery management circuit, comprising:
a first charging channel, a communication control circuit and a second charging channel, wherein
at least one of charging voltage and charging current is received from a power supply device and applied directly to a battery for charging through the first charging channel, the battery comprising a first cell and a second cell coupled in series, wherein the at least one of the charging voltage and the charging current received from the power supply device is applied directly to the battery without being converted;
the second charging channel is provided with a boost circuit, wherein the boost circuit is configured to receive an initial voltage from the power supply device and increase the initial voltage to a target voltage to charge the battery according to the target voltage, when the power supply device charges the battery through the second charging channel, the initial voltage being lower than a total voltage of the battery and the target voltage being higher than the total voltage of the battery; and
the communication control circuit is configured to:
communicate with the power supply device to make a magnitude of at least one of the charging voltage and the charging current received from the power supply device match a present charging stage of the battery, when the power supply device charges the battery through the first charging channel, wherein the present charging stage of the battery is any one of a trickle charging stage, a constant-current charging stage, and a constant-voltage charging stage.

2. The battery management circuit of claim 1, wherein the battery management circuit further comprises a Cuk circuit, the communication control circuit is further configured to send a drive signal to the Cuk circuit to drive the Cuk circuit to work, to make energy of the first cell and the second cell be transferred through the Cuk circuit to balance voltage of the first cell and voltage of the second cell, when the voltage of the first cell and the voltage of the second cell are unbalanced, and wherein the communication control circuit is further configured to adjust duty cycle of the drive signal to adjust current in the Cuk circuit, during working of the Cuk circuit.

3. The battery management circuit of claim 2, wherein the communication control circuit is further configured to acquire at least one of present power and present voltage of the first cell, and at least one of present power and present voltage of the second cell, before the drive signal is sent to the Cuk circuit to drive the Cuk circuit to work, and wherein
the communication control circuit configured to send the drive signal to the Cuk circuit to drive the Cuk circuit to work is configured to:
send the drive signal to the Cuk circuit to drive the Cuk circuit to work when a difference between at least one of the present power and the present voltage of the first cell, and at least one of the present power and the present voltage of the second cell is greater than a preset threshold value.

4. The battery management circuit of claim 3, further comprising a current detecting circuit configured to detect the current in the Cuk circuit, wherein the communication control circuit configured to adjust the duty cycle of the drive signal, to adjust the current of the Cuk circuit is configured to:
determine a target value of the current in the Cuk circuit, according to the difference between at least one of the present power and the present voltage of the first cell and at least one of the present power and the present voltage of the second cell, and
adjust the duty cycle of the drive signal to make the current in the Cuk circuit detected by the current detecting circuit reach the target value.

5. The battery management circuit of claim 2, wherein the Cuk circuit comprises at least one switch transistor, a first inductor and a second inductor, and a capacitor coupled between the first inductor and the second inductor, the first inductor is further coupled with a positive electrode of the first cell and the second inductor is further coupled with a negative electrode of the second cell, and the at least one switch transistor has one end coupled between the capacitor and one inductor and another end coupled with an electrode of the first cell or the second cell.

6. The battery management circuit of claim 5, wherein the at least one switch transistor comprises a first switch transistor and a second switch transistor, the first switch transistor has one end coupled between the capacitor and the first inductor, another end coupled with a negative electrode of the first cell, and still another end coupled with the communication control circuit; the second switch transistor has one end coupled between the capacitor and the second inductor, another end coupled with a positive electrode of the second cell, and still another end coupled with the communication control circuit; and the communication control circuit is configured to send the drive signal to the first switch transistor and the second switch transistor respectively in a predetermined time sequence to control direction and speed of energy transfer between the first cell and the second cell.

7. The battery management circuit of claim 1, wherein the communication control circuit is further configured to control switching between the first charging channel and the second charging channel.

8. The battery management circuit of claim 1, wherein the first charging channel is provided with a switch transistor to control switching between the first charging channel and the second charging channel.

9. A device to be charged, comprising:
a battery, comprising a first cell and a second cell coupled in series; and
a battery management circuit, comprising a first charging channel, a communication control circuit and a second charging channel, wherein
the first charging channel, through which at least one of charging voltage and charging current is received from a power supply device and applied directly to the battery for charging, the at least one of the charging voltage and the charging current received from the power supply device is applied directly to the battery without being converted;
the second charging channel is provided with a boost circuit; the boost circuit is configured to receive an initial voltage from the power supply device and increase the initial voltage to a target voltage to charge the battery according to the target voltage, when the power supply device charges the battery through the second charging channel; the initial voltage is lower than a total voltage of the battery and the target voltage being higher than the total voltage of the battery; and
the communication control circuit is configured to communicate with the power supply device to make a magnitude of at least one of the charging voltage and the charging current from the power supply device match a present charging stage of the battery, when the power supply device charges the battery through the first charging channel, the present charging stage of the battery is any one of a trickle charging stage, a constant-current charging stage, and a constant-voltage charging stage.

10. The device of claim 9, wherein device to be charged further comprises a Cuk circuit, the communication control circuit is further configured to send a drive signal to the Cuk circuit to drive the Cuk circuit to work, to make energy of the first cell and the second cell be transferred through the Cuk circuit to balance voltage of the first cell and voltage of the second cell, when the voltage of the first cell and the voltage of d second cell are unbalanced, and wherein the communication control circuit is further configured to adjust duty cycle of the drive signal to adjust current in the Cuk circuit, during working of the Cuk circuit.

11. The device of claim 10, wherein the communication control circuit is further configured to acquire at least one of present power and present voltage of the first cell and at least one of present power and present voltage of the second cell before the drive signal is sent to the Cuk circuit to drive the Cuk circuit to work; and
the communication control circuit configured to send the drive signal to the Cuk circuit to drive the Cuk circuit to work is configured to:
send the drive signal to the Cuk circuit to drive the Cuk circuit to work when a difference between at least one of the present power and the present voltage of the first cell, and at least one of the present power and the present voltage of the second cell is greater than a preset threshold value.

12. The device of claim 11, wherein the battery management circuit further comprises a current detecting circuit configured to detect the current in the Cuk circuit; and
the communication control circuit configured to adjust the duty cycle of the drive signal, to adjust the current of the Cuk circuit is configured to:
determine a target value of the current in the Cuk circuit, according to the difference between at least one of the present power and the present voltage of the first cell, and at least one of the present power and the present voltage of the second cell; and adjust the duty cycle of the drive signal to make the current in the Cuk circuit detected by the current detecting circuit reach the target value.

13. A method for battery management, applied in a battery management circuit, comprising:

communicating with a power supply device to make a magnitude of at least one of charging voltage and charging current provided by the power supply device match a present charging stage of a battery, when the power supply device charges the battery through a first charging channel directly, the battery comprising a first cell and a second cell coupled in series, wherein the at least one of the charging voltage and the charging current received from the power supply device is applied directly to the battery without being converted, and the present charging stage of the battery is any one of a trickle charging stage, a constant-current charging stage, and a constant-voltage charging stage; wherein the battery management circuit further comprises a second charging channel, the second charging channel is provided with a boost circuit, and the boost circuit is configured to receive an initial voltage from the power supply device and increase the initial voltage to a target voltage to charge the battery based on the target voltage, when the power supply device charges the battery through the second charging channel, wherein the initial voltage is lower than a total voltage of the battery and the target voltage is higher than the total voltage of the battery.

14. The method of claim 13, further comprising:

sending a drive signal to a Cuk circuit to drive the Cuk circuit to work, to make energy of the first cell and the second cell be transferred through the Cuk circuit to balance voltage of the first cell and voltage of the second cell, when the voltage of the first cell and the voltage of the second cell are unbalanced; and adjusting duty cycle of the drive signal to adjust current in the Cuk circuit, during working of the Cuk circuit.

15. The method of claim 14, further comprising:

before sending the drive signal to the Cuk circuit to drive the Cuk circuit to work, acquiring at least one of present power and present voltage of the first cell, and at least one of present power and present voltage of the second cell, wherein sending the drive signal to the Cuk circuit to drive the Cuk circuit to work comprises:

sending the drive signal to the Cuk circuit to drive the Cuk circuit to work when a difference between at least one of the present power and the present voltage of the first cell and at least one of the present power and the present voltage of the second cell is greater than a preset threshold value.

16. The method of claim 15, wherein adjusting the duty cycle of the drive signal to adjust the current in the Cuk circuit comprises:

determining a target value of the current in the Cuk circuit according to the difference between at least one of the present power and the present voltage of the first cell and at least one of the present power and the present voltage of the second cell; and adjusting the duty cycle of the drive signal to make the current in the Cuk circuit reach the target value.

17. The method of claim 13, further comprising:

controlling switching between the first charging channel and the second channel.

* * * * *